(12) United States Patent
Lino et al.

(10) Patent No.: US 11,551,409 B2
(45) Date of Patent: Jan. 10, 2023

(54) RENDERING PORTIONS OF A THREE-DIMENSIONAL ENVIRONMENT WITH DIFFERENT SAMPLING RATES UTILIZING A USER-DEFINED FOCUS FRAME

(71) Applicant: Institut Mines Telecom, Palaiseau (FR)

(72) Inventors: Christophe Lino, Savigny-sur-Orge (FR); Tamy Boubekeur, Paris (FR)

( * ) Notice: Subject to any disclaimer, the term of this patent is extended or adjusted under 35 U.S.C. 154(b) by 0 days.

(21) Appl. No.: 17/108,250

(22) Filed: Dec. 1, 2020

(65) Prior Publication Data
US 2022/0172427 A1     Jun. 2, 2022

(51) Int. Cl.
| | |
|---|---|
| *G06T 15/20* | (2011.01) |
| *G06F 3/04817* | (2022.01) |
| *G06T 11/20* | (2006.01) |
| *G06F 3/04815* | (2022.01) |
| *G06V 10/25* | (2022.01) |

(52) U.S. Cl.
CPC ........ *G06T 15/205* (2013.01); *G06F 3/04815* (2013.01); *G06F 3/04817* (2013.01); *G06T 11/203* (2013.01); *G06V 10/25* (2022.01)

(58) Field of Classification Search
CPC . G06T 15/205; G06T 11/203; G06F 3/04815; G06F 3/04817; G06K 9/3233
See application file for complete search history.

(56) References Cited

U.S. PATENT DOCUMENTS

| | | | | |
|---|---|---|---|---|
| 4,698,664 A | * | 10/1987 | Nichols ................. | G11B 27/34 715/857 |
| 5,919,249 A | * | 7/1999 | Herbstman .......... | G11B 27/034 |

(Continued)

OTHER PUBLICATIONS

SolidWorks (Dassault Systems, "SolidWorks Fundamentals > Selecting Over Geometry, What's New in SolidWorks 2018", published at https://help.solidworks.com/2018/English/WhatsNew/t_select_over_geometry.htm and archived at archive.org as of at Oct. 16, 2017) (Year: 2017).*

(Continued)

*Primary Examiner* — William A Beutel
(74) *Attorney, Agent, or Firm* — Keller Preece PLLC

(57) ABSTRACT

Methods, systems, and non-transitory computer readable storage media are disclosed for rendering portions of a three-dimensional environment at different sampling rates based on a focus frame within a graphical user interface. Specifically, the disclosed system provides a tool for marking a region of a graphical user interface displaying a three-dimensional environment. The disclosed system generates a focus frame based on the marked region of the graphical user interface and attaches the focus frame to a portion of the three-dimensional environment. The disclosed system assigns a first sampling rate to the portion of the three-dimensional environment displayed within the focus frame and a second sampling rate to portions of the three-dimensional environment outside the focus frame. The disclosed system renders the three-dimensional environment by sampling the portion within the focus frame at the first sampling rate and the portions outside the focus frame at the second sampling rate.

20 Claims, 11 Drawing Sheets

(56) References Cited

U.S. PATENT DOCUMENTS

| | | | |
|---|---|---|---|
| 6,083,168 A * | 7/2000 | Hossack | G01S 7/52046 |
| | | | 600/443 |
| 6,300,955 B1 * | 10/2001 | Zamir | G06T 7/194 |
| | | | 382/175 |
| 6,549,203 B2 | 4/2003 | Randel | |
| 7,006,090 B2 | 2/2006 | Mittring | |
| 9,299,188 B2 | 3/2016 | Karsch et al. | |
| 9,367,203 B1 | 6/2016 | Costello | |
| 9,536,345 B2 | 1/2017 | Krig | |
| 10,817,745 B2 | 10/2020 | Harrison et al. | |
| 11,068,155 B1 * | 7/2021 | Dalmia | G06F 30/12 |
| 2010/0302245 A1 | 12/2010 | Best | |
| 2012/0092357 A1 * | 4/2012 | Wang | G06T 11/001 |
| | | | 345/581 |
| 2012/0120277 A1 * | 5/2012 | Tsai | H04N 5/232935 |
| | | | 348/E9.052 |
| 2012/0154277 A1 * | 6/2012 | Bar-Zeev | G06F 3/013 |
| | | | 345/158 |
| 2012/0209828 A1 | 8/2012 | Takenaka et al. | |
| 2014/0343699 A1 | 11/2014 | Engelen et al. | |
| 2016/0071304 A1 * | 3/2016 | Jang | G06T 15/20 |
| | | | 345/419 |
| 2016/0267710 A1 | 9/2016 | Huang et al. | |
| 2017/0098330 A1 * | 4/2017 | Inomata | G06F 3/013 |
| 2018/0239515 A1 | 8/2018 | Cooper et al. | |
| 2018/0247458 A1 * | 8/2018 | Wilson | H04N 19/167 |
| 2019/0340306 A1 | 11/2019 | Harrison et al. | |
| 2021/0065440 A1 | 3/2021 | Sunkavalli et al. | |
| 2021/0209828 A1 | 7/2021 | Li et al. | |

OTHER PUBLICATIONS

D. R. Baum, H. E. Rushmeier, and J. M. Winget. 1989. Improving Radiosity Solutions Through the Use of Analytically Determined Form-factors. SIGGRAPH Comput. Graph. 23, 3 (Jul. 1989), 325-334. https://doi.org/10.1145/74334 .74367.

James F. Blinn. 1977. Models of Light Reflection for Computer Synthesized Pictures. SIGGRAPH Comput. Graph. 11, 2 (Jul. 1977), 192-198. https://doi.org/10.1145/965141.563893.

James F. Blinn and Martin E. Newell. 1976. Texture and Reflection in Computer Generated Images. Commun. ACM 19, 10 (Oct. 1976), 542-547. https://doi.org/10.1145/360349.360353.

Brent Burley. 2012. Physically Based Shading at Disney. Siggraph Course (2012). https://blog.selfshadow.com/publications/s2012-shading-course/.

R. L. Cook and K. E. Torrance. 1982. A Reflectance Model for Computer Graphics. ACM Trans. Graph. 1, 1 (Jan. 1982), 7-24. https://doi .org/10.1145/357290.357293.

P. Debevec. 2003. HDRI and Image-Based Lighting. Siggraph Course (2003). https://www.siggraph.org/s2003/conference/courses/debevec.html.

Paul Debevec. 2005. A Median Cut Algorithm for Light Probe Sampling. In ACM SIGGRAPH 2005 Posters (SIGGRAPH '05). ACM, New York, NY, USA,Article66. https://doi.org/10.1145/1186954.1187029.

Jonathan Dupuy, Eric Heitz, and Laurent Belcour. 2017. A Spherical Cap Preserving Parameterization for Spherical Distributions. ACM Trans. Graph. 36, 4, Article 139 (Jul. 2017), 12 pages, https://doi.org/10.1145/3072959.3073694.

Cindy M. Goral, Kenneth E. Torrance, Donald P. Greenberg, and Bennett Battaile. 1984. Modeling the Interaction of Light Between Diffuse Surfaces. SIGGRAPH Comput. Graph. 18, 3 (Jan. 1984), 213-222. https://doi.org/10.1145/ 964965.808601.

Eric Heitz. 2017. Analytical calculation of the solid angle subtended by an arbitrarily positioned el-lipsoid to a point source. Nuclear Instruments and Methods in Physics Research Section A: Accelerators, Spectrometers, Detectors and Associated Equipment 852 (2017), 10-14. https://doi.org/10.1016/j.nima.2017.02.004.

Eric Heitz, Jonathan Dupuy, Stephen Hill, and David Neubelt. 2016. Real-time Polygonal-light Shading with Linearly Transformed Cosines. ACM Trans. Graph. 35, 4, Article 41 (Jul. 2016), 8 pages, https://doi.org/10.1145/ 2897824.2925895.

Eric Heitz, Stephen Hill, and Morgan McGuire. 2018. Combining Analytic Direct Illumination and Stochastic Shadows. In Proceedings of the ACM SIGGRAPH Symposium on Interactive 3D Graphics and Games (I3D '18). ACM, New York, NY, USA, Article 2, 11 pages. https://doi.org/10.1145/3190834.3190852.

James T. Kajiya. 1986. The Rendering Equation. SIGGRAPH Comput. Graph. 20, 4 (Aug. 1986), 143-150. https://doi.org/10.1145/15886 .15902.

Jan Kautz, Pere-Pau Vazquez, Wolfgang Heidrich, and Hans-Peter Seidel. 2000. A Unified Approach to Prefiltered Environment Maps. In Rendering Techniques 2000, Bernard Peroche and Holly Rushmeier (Eds.). Springer Vienna, Vienna, 185-196.

P. Lecocq, A. Dufay, G. Sourimant, and J. E. Marvie. 2017. Analytic Approximations for Real-Time Area Light Shading. IEEE Transactions on Visualization and Computer Graphics pp. 99 (2017), 1-1. https://doi.org/10.1109/TVCG.2017 .2656889.

Oleg Mazonka. 2012. Solid Angle of Conical Surfaces, Polyhedral Cones, and Intersecting Spherical Caps. Article arXiv:1205.1396 (May 2012), arXiv:1205.1396 pages. arXiv:math.MG/1205.1396.

Matt Pharr, Wenzel Jakob, and Greg Humphreys. 2016. Physically based rendering: From theory to implementation. Morgan Kaufmann.

Bui Tuong Phong. 1975. Illumination for Computer Generated Pictures. Commun. ACM 18, 6 (Jun. 1975), 311-317. https://doi.org/10.1145/ 360825.360839.

Peter-Pike Sloan, Jan Kautz, and John Snyder. 2002. Precomputed Radiance Transfer for Real-time Rendering in Dynamic, Low-frequency Lighting Environments.ACM Trans. Graph.21, 3 (Jul. 2002), 527-536.https://doi.org/10.1145/566654.566612.

Namco. 1993. System 16—Namco Magic Edge Hornet Simulator Hardware (Namco). https://www.system16.com. (1993).

Federspiel, Alex. "Equation of a Sphere, Plus Center and Radius." Retrieved from www.expii.com/t/equation-of-a-sphere-1321 on Sep. 28, 2021. (Year: 2015).

U.S. Appl. No. 17/091,313, Oct. 22, 2021, Office Action.
U.S. Appl. No. 16/953,708, Oct. 1, 2021, Office Action.
U.S. Appl. No. 17/091,313, Mar. 28, 2022, Office Action.
U.S. Appl. No. 16/953,708, Mar. 16, 2022, Notice of Allowance.
U.S. Appl. No. 17/091,313, dated Nov. 21, 2022, Notice of Allowance.

* cited by examiner

RENDERING PORTIONS OF A THREE-DIMENSIONAL ENVIRONMENT WITH DIFFERENT SAMPLING RATES UTILIZING A USER-DEFINED FOCUS FRAME

BACKGROUND

Improvements to computer processing technologies have led to significant advancements in the field of digital image processing and rendering. Specifically, increased computer processing speeds and resources have provided many different types of systems the ability to process and render three-dimensional environments. For example, systems use image processing and lighting simulations to render three-dimensional environments including three-dimensional models and digital light sources. Additionally, many systems utilize real-time rendering and lighting simulations (e.g., ray-tracing shading and sampling) to continuously update displays of three-dimensional environments for providing previews of modifications to light sources or other three-dimensional elements. Because processing lighting simulations in rendering three-dimensional environments can utilize a significant amount of computing resources, optimizing the rendering process is an important aspect of accurately and efficiently providing live previews of three-dimensional renderings.

SUMMARY

This disclosure describes one or more embodiments of methods, non-transitory computer readable media, and systems that solve the foregoing problems in addition to providing other benefits. In particular, the disclosed systems utilize a user-defined focus frame to render a portion of a three-dimensional environment at a different sampling rate than other portions of the three-dimensional environment. Specifically, the disclosed systems provide a tool for marking a region of a graphical user interface in which to prioritize rendering a portion of a three-dimensional environment. For example, the disclosed systems determine a focus frame that includes the portion of the three-dimensional environment based on a set of interface markers. The disclosed systems then attach the focus frame to one or more elements in the three-dimensional environment and utilize a sampling ratio to assign different sampling rates inside the focus frame and outside the focus frame. Accordingly, the disclosed systems provide interactive controls for managing a computation budget when rendering three-dimensional environments.

BRIEF DESCRIPTION OF THE DRAWINGS

The detailed description refers to the drawings briefly described below.

DETAILED DESCRIPTION

Figure 1:
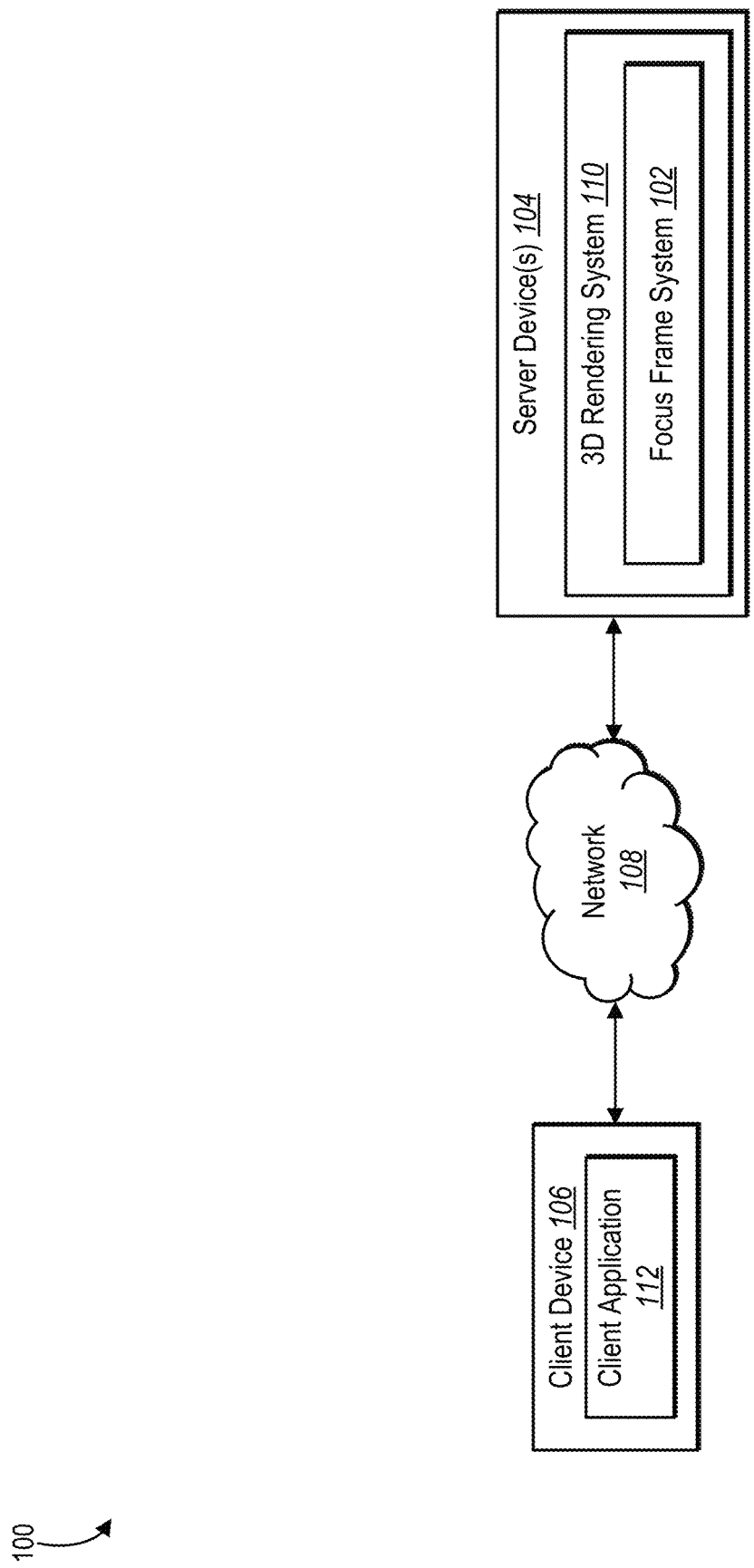
FIG. 1 illustrates a block diagram of a system environment in which a focus frame system can operate in accordance with one or more implementations.

One or more embodiments of the present disclosure include a focus frame system that utilizes a focus frame to determine different sampling rates for rendering different portions of a three-dimensional environment. Specifically, the focus frame system provides a graphical user interface tool for inserting interface marks into a graphical user interface to define a region of the graphical user interface. For example, the focus frame system determines a "focus frame" from the region of the graphical user interface to determine a portion of a three-dimensional environment (e.g., a specific three-dimensional element) to render at a different (e.g., higher) sampling rate than other portions of the three-dimensional environment. The focus frame system also automatically refits the focus frame to maintain a higher sampling rate for the portion of the three-dimensional environment in response to a change in viewpoint or position without requiring a user to edit or re-define the focus frame. Accordingly, the focus frame system provides a simple tool for efficiently dedicating computing resources to render previews of specific portions of a three-dimensional environment at high rendering qualities while maintaining low overall sampling budget.

By inserting a focus frame into a graphical user interface, the focus frame system renders a portion of a three-dimensional environment more quickly than other portions of the three-dimensional environment. In one or more embodiments, the focus frame system provides a live render preview of the three-dimensional environment to update the portion of the three-dimensional environment corresponding to the focus frame. More specifically, the focus frame system renders salient content within a three-dimensional environment more quickly than content of less importance. The focus frame system provides a live render preview to allow a user to view the effects of adjusting lighting parameters, materials, object positions/shapes, or other content within the three-dimensional environment as the changes occur. Thus, the focus frame system allows a user to get faster interactive feedback on lighting, material, and other effects occurring in regions of interest.

In one or more embodiments, the focus frame system receives a selection of a region of a graphical user interface displaying a three-dimensional environment. For example, as mentioned, the focus frame system provides a tool for marking the graphical user interface. To illustrate, the focus frame system receives a plurality of interface markers that indicate a boundary of a particular region of the graphical user interface (e.g., a "focus frame"). In some embodiments, the focus frame system provides a brushstroke tool that allows a user to manually insert a plurality of brushstrokes to mark the boundary of the focus frame.

In response to determining a region of a graphical user interface based on a set of interface markers, in one or more embodiments, the focus frame system determines a portion of a three-dimensional environment corresponding to the region of the graphical user interface. More specifically, the focus frame system determines a portion of the three-dimensional environment displayed within a focus frame. For example, the focus frame system determines that the portion of the three-dimensional environment includes one or more three-dimensional elements displayed within the focus frame. In some embodiments, the focus frame system attaches the focus frame corresponding to the selected region to the identified three-dimensional element(s).

In one or more embodiments, in connection with attaching a focus frame to a specific portion of a three-dimensional environment (e.g., to a three-dimensional element), the focus frame system assigns a render sampling priority to the portion of the three-dimensional environment. In particular, assigning a render sampling priority involves assigning a sampling rate to the portion of the three-dimensional environment that is higher than a sampling rate for other portions of the three-dimensional environment. For example, the focus frame system assigns a first sampling rate for rendering the portion within the focus frame and a second sampling rate for rendering the portion(s) outside the focus frame, in which the first sampling rate is higher than the second sampling rate. Additionally, in one or more embodiments, the focus frame system determines the first sampling rate and the second sampling rate based on an overall sampling budget for rendering the three-dimensional environment.

In one or more embodiments, the second sampling rate is a constant sampling rate outside the focus frame. In alternative embodiments, the second sampling rate is a variable sampling rate for rendering portions outside the focus frame. For example, the second sampling rate decreases with distance from the focus frame such that the focus frame system renders portions nearest to the focus frame at higher sampling rates than portions farther away from the focus frame. In additional embodiments, the focus frame system applies a first sampling rate to a center of the focus frame, one or more additional sampling rates between the center of the focus frame and an edge inside the focus frame, and one or more additional sampling rates outside the focus frame.

Additionally, in one or more embodiments, the focus frame system renders the three-dimensional environment based on the render sampling priority for the focus frame. Specifically, the focus frame system renders the portion of the three-dimensional environment displayed within the focus frame at a first sampling rate. The focus frame system also renders the portion(s) of the three-dimensional environment displayed outside the focus frame at a second sampling rate lower than the first sampling rate. Accordingly, the focus frame system prioritizes computing resources for rendering the portion within the focus frame by sampling the portion within the focus frame at a higher rate and, thus, updating the portion within the focus frame faster than outside the focus frame.

In additional embodiments, the focus frame system continually updates a portion of a three-dimensional environment associated with the focus frame in response to changes to the portion of the three-dimensional environment. For instance, by attaching the focus frame to a specific three-dimensional element, the focus frame system updates the focus frame automatically in response to changes to the three-dimensional environment. To illustrate, the focus frame system updates the position and size of the focus frame in response to a change in the position of the three-dimensional element. Additionally, the focus frame system updates the position and size of the focus frame in response to a change of view within the graphical user interface (e.g., a change in position of a camera element within the three-dimensional environment). The focus frame system thus provides real-time rendering previews utilizing an adaptable focus frame with changes to parameters of the three-dimensional environment.

As mentioned, many systems that provide editing and viewing of three-dimensional environments utilize real-time rendering and lighting simulations to render three-dimensional environments. For example, some conventional systems utilize a rendering process that follows the same (or similar) pattern to render any three-dimensional environment. To illustrate, to generate fully rendered three-dimensional images, some conventional systems follow a pattern that renders a three-dimensional environment in chunks, typically beginning from the center of a view frame and spiraling outward. Accordingly, the conventional systems typically utilize a single pattern for generating full renders of three-dimensional environments irrespective of content, which can result in significant waiting time for content creators if important elements of the environments are at the edges of the renders.

Furthermore, as mentioned, some existing systems provide real-time rendering previews of three-dimensional environments. Specifically, some existing systems sample a three-dimensional environment displayed within a graphical user interface using real-time ray-tracing processes. Because real-time ray-tracing processes utilize a significant amount of resources, the conventional systems sample evenly across the displayed three-dimensional environment. Additionally, the conventional systems sample at a significantly lower rate than for full renders, which usually leads to a significant amount of noise in the rendered preview. The noise can result in low render accuracy and omit fine details from the rendered preview.

The disclosed focus frame system provides a number of advantages over existing systems. For example, the focus frame system improves the flexibility of computing systems that render three-dimensional environments. To illustrate, while computing processes have improved significantly to provide faster and more accurate rendering of three-dimensional environments, the complexity of three-dimensional environments has also improved, resulting in increased computing resource requirements. By determining a specific region of a graphical user interface in which to dedicate more computing resources for rendering, the focus frame system provides improved flexibility for rendering a specified portion of a three-dimensional environment. More specifically, the focus frame system provides a faster rendering convergence within a given region of interest according to user preferences and/or content of a three-dimensional image.

Additionally, the focus frame system improves the efficiency and accuracy of computing devices that render three-dimensional environments. Specifically, by dedicating more resources to rendering a region of interest of a three-dimensional environment within a focus frame than to other portions of the three-dimensional environment, the focus frame system more accurately represents the selected portion of interest. For instance, in contrast to conventional systems that require a user to increase the sampling rate for the entire three-dimensional environment to improve sampling in a specific region, the focus frame system provides improved sampling resolution within a selected region without changing the overall sampling budget. This results in improved rendering speed and accuracy for portions of a three-dimensional environment that are most useful to a user, which is particularly important when updating a live rendering preview for testing modifications to the parameters of the three-dimensional environment.

Turning now to the figures, FIG. 1 illustrates a schematic diagram of a system environment 100 in which a focus frame system 102 operates. In particular, the system environment 100 includes server device(s) 104 and a client device 106 in communication via a network 108. Moreover, as shown, the server device(s) 104 include a three-dimensional rendering system ("3D rendering system 110"), which includes the focus frame system 102. Furthermore, the client device 106 includes a client application 112 (e.g., a digital three-dimensional editing application).

As shown in FIG. 1, the server device(s) 104 includes or hosts the 3D rendering system 110. In one or more embodiments, the 3D rendering system 110 includes, or is part of, one or more systems that implement the management and rendering of three-dimensional digital images for storing, creating, modifying, or displaying three-dimensional digital images for one or more users of the 3D rendering system 110. For example, the 3D rendering system 110 provides tools for generating, editing, or otherwise interacting with three-dimensional environments using one or more graphical user interface tools via the client application 112 on the client device 106. In some embodiments, the 3D rendering system 110 provides a graphical user interface (e.g., within a standalone client or a web browser) to the client device 106 for a user to interact with three-dimensional environments via the client application 112 on the client device 106.

As mentioned, the 3D rendering system 110 provides tools for generating, editing, or otherwise interacting with three-dimensional elements in three-dimensional environments. In one or more embodiments, the 3D rendering system 110 provides tools for generating and rendering three-dimensional models (e.g., including one or more three-dimensional objects) in a three-dimensional environment. For example, the 3D rendering system 110 provides tools for modifying shapes, positions, and/or materials of three-dimensional models. Additionally, the 3D rendering system 110 provides tools for inserting light sources within a three-dimensional environment or modifying types, shapes, positions, orientations, and/or emissive properties of light sources. The 3D rendering system 110 also renders the three-dimensional environments to generate three-dimensional images or videos. The 3D rendering system 110 thus provides three-dimensional images or video for use in a variety of applications including, but not limited to, three-dimensional digital media applications, databases of three-dimensional images/video, or video game applications.

In connection with generating, editing, or interacting with three-dimensional environments, the 3D rendering system 110 includes the focus frame system 102 to render different portions of three-dimensional environments at different sampling rates. In one or more embodiments, the focus frame system 102 provides one or more tools for inserting a focus frame into a graphical user interface. Specifically, the focus frame system 102 provides a tool (e.g., a brushstroke tool) to insert markers into a graphical user interface to mark a specific region of the graphical user interface (e.g., via the client application 112 on the client device 106). When rendering the three-dimensional environment to generate a digital image, the focus frame system 102 utilizes a first sampling rate for a portion of the three-dimensional environment displayed within the focus frame and a second sampling rate for portions of the three-dimensional environment displayed outside the focus frame. Thus, in one or more embodiments, the focus frame system 102 samples the portion displayed within the focus frame faster than portions outside the focus frame.

Additionally, in one or more embodiments, the focus frame system 102 attaches the focus frame to a specific element displayed within the region of the graphical user interface. For example, the focus frame system 102 modifies the focus frame in response to modifications to the corresponding element. To illustrate, the focus frame system 102 automatically modifies a position, a shape and/or a size of the focus frame in response to a change in position of the corresponding element. In some embodiments, the focus frame system 102 also modifies a position and/or size of the focus frame in response to a change in a view within the graphical user interface based on a change in a camera projection matrix (e.g., a change in a position, orientation, or intrinsic parameters of a camera within the three-dimensional environment). Accordingly, the focus frame system 102 updates the rendering automatically for display at the client device 106 after first determining the focus frame.

In addition, as shown in FIG. 1, the system environment 100 includes the client device 106. In one or more embodiments, the client device 106 includes, but is not limited to, a mobile device (e.g., smartphone or tablet), a laptop, or a desktop, including those explained below with reference to FIG. 8. Furthermore, although not shown in FIG. 1, in one or more embodiments, the client device 106 is operated by a user (e.g., a user included in, or associated with, the system environment 100) to perform a variety of functions. In particular, the client device 106 performs functions, such as, but not limited to, accessing, viewing, and interacting with three-dimensional environments (e.g., via the client application 112). Additionally, in some embodiments, the client device 106 performs functions for generating and editing three-dimensional environments to provide to the 3D rendering system 110 or another system via the network 108. Although FIG. 1 illustrates the system environment 100 with a single client device 106, in some embodiments, the system environment 100 includes a different number of client devices.

In one or more embodiments, the server device(s) 104 include a variety of computing devices, including those described below with reference to FIG. 8. For example, the server device(s) 104 includes one or more servers for storing and processing data for digital content items (e.g., three-dimensional scenes) associated with a plurality of users of the 3D rendering system 110 or the focus frame system 102. In some embodiments, the server device(s) 104 also include a plurality of computing devices in communication with each other, such as in a distributed storage environment. In some embodiments, the server device(s) 104 comprise a content server for storing three-dimensional images, videos, or scenes. In additional embodiments, the server device(s) 104 also comprises an application server, a communication server, a web-hosting server, a social networking server, a digital content campaign server, or a digital communication management server.

Additionally, as shown in FIG. 1, the system environment 100 includes the network 108. The network 108 enables communication between components of the system environment 100. In one or more embodiments, the network 108 may include the Internet or World Wide Web. Additionally, in some embodiments, the network 108 includes various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, in one or more embodiments, the server device(s) 104 and the client device 106 communicate via the network using a variety of communication platforms and technologies suitable for transporting data and/or communication signals, including any known communication technologies, devices, media, and protocols supportive of data communications, examples of which are described with reference to FIG. 8.

Although FIG. 1 illustrates the server device(s) 104 and the client device 106 communicating via the network 108, in one or more embodiments, the various components of the system environment 100 communicate and/or interact via other methods (e.g., the server device(s) 104 and the client device 106 communicate directly). Furthermore, although FIG. 1 illustrates the focus frame system 102 being implemented by a particular component and/or device within the system environment 100, in one or more embodiments, the focus frame system 102 is implemented, in whole or in part, by other computing devices and/or components in the system environment 100 (e.g., the client device 106). For example, rather than the 3D rendering system 110 and focus frame system 102 being hosted on the server device(s) 104 and supporting the client application 112, the 3D rendering system 110 and focus frame system 102 can be resident and run directly on the client device 106.

Figure 2:
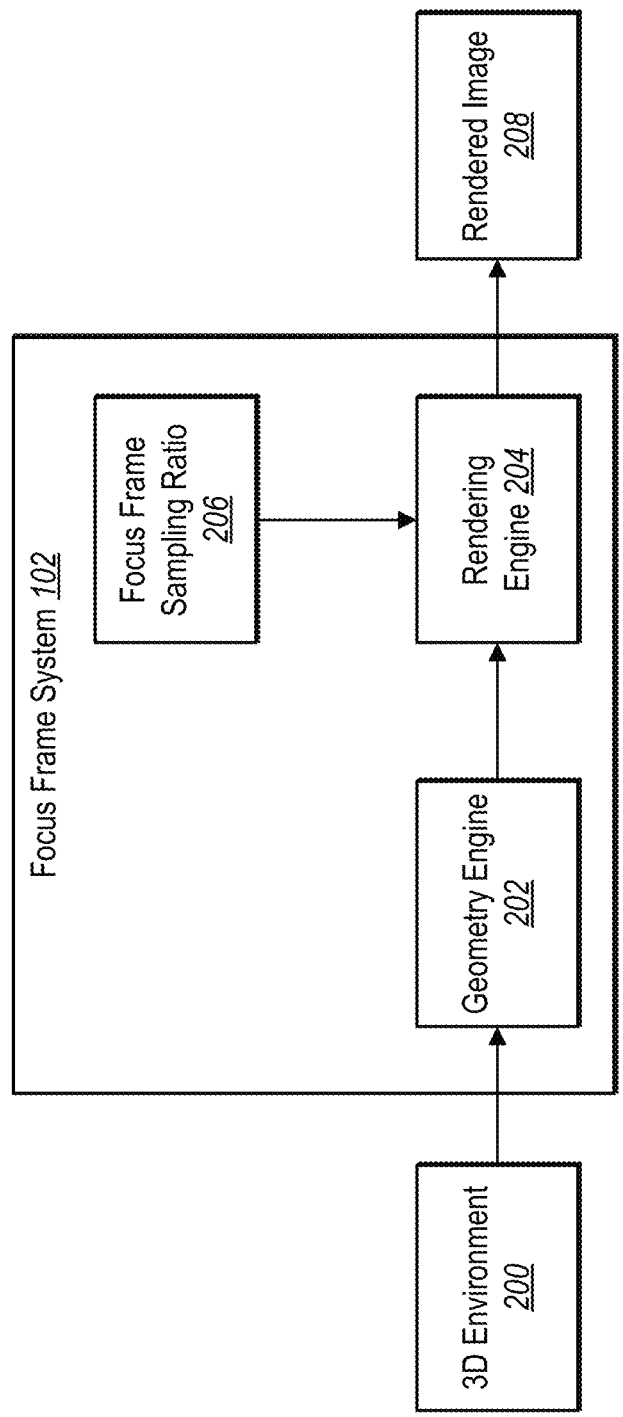
FIG. 2 illustrates a diagram of a pipeline for rendering three-dimensional environments utilizing a focus frame in accordance with one or more implementations.

As mentioned above, the focus frame system 102 utilizes a focus frame to sample different portions of a three-dimensional environment at different sampling rates. FIG. 2 illustrates a pipeline for rendering three-dimensional images utilizing a focus frame. Specifically, FIG. 2 illustrates an overview of the process for generating an image from a three-dimensional environment using a plurality of different sampling rates according to a focus frame.

FIG. 2 illustrates that the focus frame system 102 renders a three-dimensional environment ("3D environment 200"). In one or more embodiments, the 3D environment 200 includes one or more three-dimensional elements arranged in a scene. For example, the 3D environment 200 includes one or more objects and one or more digital light sources. As mentioned, the focus frame system 102 can be part of a system that renders three-dimensional environments (e.g., the 3D rendering system 110 of FIG. 1). Accordingly, in some embodiments, the focus frame system 102 obtains the 3D environment 200 from a three-dimensional editing application (e.g., the client application 112 of FIG. 1) associated with the rendering system.

According to one or more embodiments, the focus frame system 102 includes a geometry engine 202 to determine geometries of three-dimensional elements within the 3D environment 200. For instance, the geometry engine 202 determines positions of one or more three-dimensional objects within the 3D environment 200 to determine the absolute and relative positions of the object(s). To illustrate, the geometry engine 202 determines vertex positions of vertices of each object in the 3D environment 200 according to a global origin point utilizing (x, y, z) coordinates of the vertices. The focus frame system 102 thus also determines the positions of the objects relative to other objects in the 3D environment 200, if applicable.

Furthermore, in one or more embodiments, the geometry engine 202 determines lighting parameters associated with one or more digital light sources in the 3D environment 200. Specifically, each light source includes a geometric position or a geometric direction within the 3D environment 200. Additionally, the light source(s) include emittance parameters to project light in one or more directions with one or more light intensity levels. In some embodiments, the light source(s) can also include other parameters that determine how light from the light source(s) affects the object(s) in the 3D environment 200 (e.g., via direct lighting, indirect lighting, and/or shadows).

After the geometry engine 202 determines geometries and lighting parameters of three-dimensional elements within the 3D environment 200, the focus frame system 102 provides the geometries and lighting parameters to a rendering engine 204. According to one or more embodiments, the rendering engine 204 renders the 3D environment 200 based on the data extracted by the geometry engine 202. For example, the rendering engine 204 renders the 3D environment 200 by sampling the geometries based on the lighting parameters given a view of a graphical user interface.

In one or more embodiments, the rendering engine 204 determines a view of the graphical user interface for rendering the 3D environment 200 based on a camera element within the 3D environment 200. For example, a camera element determines a perspective or orthogonal projection that the focus frame system 102 utilizes to render the 3D environment 200. More specifically, the rendering engine 204 of the focus frame system 102 utilizes a position, a view, a direction, and an up vector (e.g., an angle around the view direction) of the camera element to determine the point of view at which the rendering engine 204 renders the 3D environment.

Furthermore, in one or more embodiments, the rendering engine 204 utilizes a focus frame sampling ratio 206 to determine a sampling rate to use in one or more portions of the 3D environment 200. For instance, the focus frame system 102 determines the focus frame sampling ratio 206 according to a sampling budget for rendering the 3D environment 200. In particular, the focus frame sampling ratio 206 indicates a ratio between a sampling rate to use for a first portion of the 3D environment and a sampling rate to use for a second portion of the 3D environment 200. To illustrate, the focus frame system 102 utilizes the focus frame sampling ratio 206 to determine a first sampling rate for a portion of the 3D environment 200 displayed within a focus frame and a second sampling rate (lower than the first sampling rate) for one or more other portions of the 3D environment 200.

Utilizing the determined sampling rates for the different portions of the 3D environment 200 based on the focus frame, the focus frame system 102 generates a rendered image 208. For example, the rendering engine 204 generates the rendered image 208 by sampling a portion of the 3D environment 200 (e.g., displayed within a focus frame) at a first sampling rate and at least one portion of the 3D environment 200 (e.g., displayed outside the focus frame) at a second sampling rate. In one or more embodiments, the rendering engine 204 performs sampling via ray-tracing (e.g., Monte Carlo ray-tracing) to simulate the path of light emitted from a virtual light source on a plurality of surface points of objects within the 3D environment 200. In one or more additional embodiments, the rendering engine 204 utilizes progressive rendering to accumulate frames in which the rendering engine 204 computes, for each frame, the contributions/shadows/reflections for a greater number of light sources (e.g., at a first sampling rate) for shaded points within a focus frame than outside the focus frame. The rendering engine 204 thus models the illumination within a scene to produce realistic lighting effects (e.g., shadows, highlights, reflections, ambient occlusion) on one or more objects.

In some embodiments, the rendered image 208 is a live rendering preview that continuously updates within a graphical user interface. For instance, the rendering engine 204 continuously samples points displayed within a graphical user interface to provide a real-time preview of the 3D environment 200. Thus, a user can view changes made to the elements within the 3D environment 200 as they occur (e.g., material changes, lighting changes, changes in the elements geometry). Additionally, by sampling a portion of the 3D environment 200 (i.e., a portion displayed within a focus frame) at a higher sampling rate than other portions of the 3D environment 200, the portion within the focus frame updates more quickly than other portions.

In one or more alternative embodiments, the rendered image 208 is a full rendering of the 3D environment 200 that the focus frame system 102 renders in chunks of predefined sizes based on render settings. For example, the rendering engine 204 utilizes the focus frame to determine render settings indicating a starting point for generating the rendered image 208. To illustrate, the rendering engine 204 initializes a rendering process in a chunk within the focus frame and finishes rendering chunks within (either fully or partially) the focus frame prior to rendering chunks outside the focus frame. The focus frame system 102 provides a partial rendering with the final render settings by first sampling the portion of the 3D environment 200 displayed within the focus frame before sampling portions outside the focus frame. According to such embodiments, the focus frame system 102 provides a full rendering of portions of interest to a user.

Figure 3A:
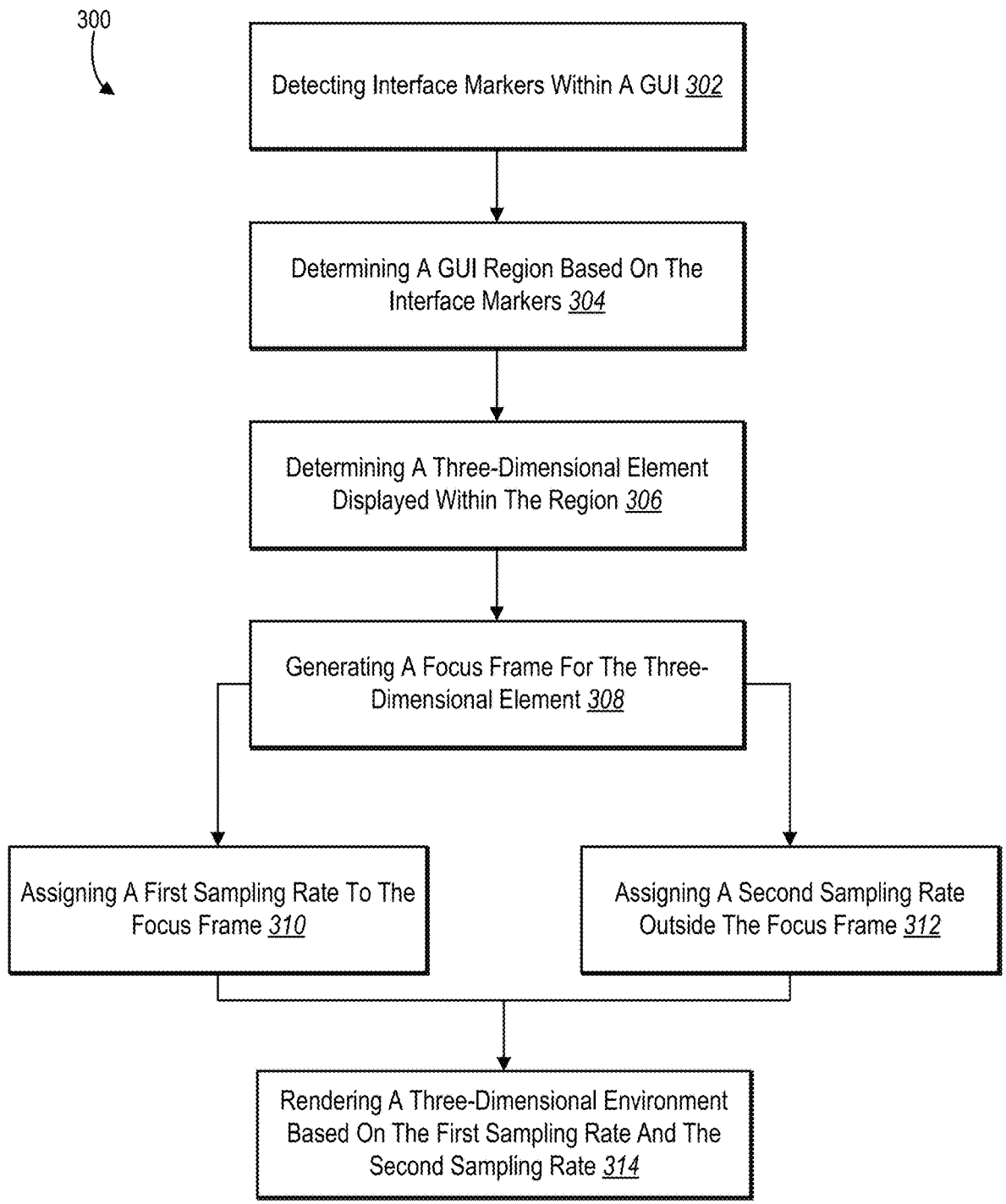
FIGS. 3A-3B illustrate diagrams of processes for generating a focus frame and rendering a three-dimensional environment based on the focus frame in accordance with one or more implementations.
Figure 3B:
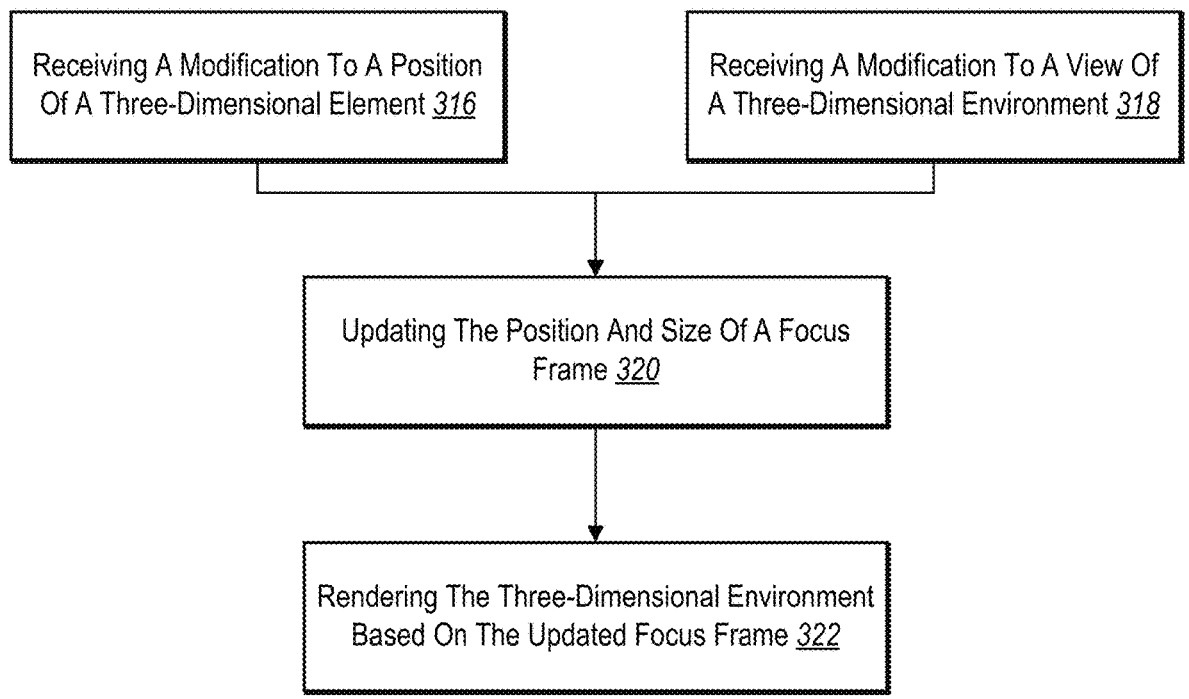

FIGS. 3A-3B illustrate flowchart diagrams of the focus frame system 102 rendering a three-dimensional environment based on a focus frame. Specifically, FIG. 3A illustrates the focus frame system 102 generating a focus frame based on a user-defined region of a graphical user interface. Additionally, FIG. 3A illustrates the focus frame system 102 assigning different sampling rates to different portions of the three-dimensional environment in accordance with the focus frame. FIG. 3B illustrates the focus frame system 102 automatically updating the focus frame in response to a modification to a portion of the three-dimensional environment. FIG. 3B further illustrates the focus frame system 102 rendering the three-dimensional environment based on the updated focus frame.

As shown in FIG. 3A, the focus frame system 102 performs a series of steps associated with rendering a three-dimensional environment utilizing a focus frame. Specifically, FIG. 3A illustrates that the series of acts 300 includes an act 302 of detecting interface markers within a graphical user interface ("GUI"). For example, in one or more embodiments, the focus frame system 102 provides a tool for inserting markers into a graphical user interface. In some embodiments, the markers include brushstrokes associated with a brushstroke tool. To illustrate, the focus frame system 102 receives user inputs (or indications of user inputs) to mark the graphical user interface with a plurality of brushstrokes at a plurality of positions in the graphical user interface. Alternatively, the focus frame system 102 receives another type of user input that demarcates boundaries of a desired region on which to focus.

Additionally, FIG. 3A illustrates that the series of acts 300 includes an act 304 of determining a GUI region based on the interface markers. According to one or more embodiments, in response to detecting a user input to insert a plurality of interface markers into a graphical user interface, the focus frame system 102 determines positions of the plurality of interface markers within the graphical user interface. For example, the focus frame system 102 determines coordinate positions of the interface markers within the graphical user interface according to set of coordinate axes. The focus frame system 102 then determines a boundary of the region that corresponds to the coordinate positions of the interface markers.

FIG. 3A also illustrates that the series of acts 300 includes an act 306 of determining a three-dimensional element displayed within the region. In particular, the focus frame system 102 first determines a portion of the three-dimensional environment that is displayed within the determined region of the graphical user interface. In some embodiments, the focus frame system 102 determines the portion of the three-dimensional environment by determining one or more surfaces or objects within a three-dimensional environment that are displayed within the region of the graphical user interface.

In some examples, the focus frame system 102 determines that the region includes a subset of three-dimensional elements within a three-dimensional environment. In additional examples, the focus frame system 102 determines that the region includes one or more partial three-dimensional elements (e.g., a portion of a three-dimensional element is displayed within the focus frame and a portion of the three-dimensional element is displayed outside the focus frame). In such embodiments, the focus frame system 102 determines that the portion of the three-dimensional environment corresponding to the region includes only the portion of the three-dimensional element displayed within the region.

FIG. 3A further illustrates that the series of acts 300 includes an act 308 of generating a focus frame for the three-dimensional element. Specifically, after (or otherwise in connection with) determining the portion of a three-dimensional environment displayed within a selected region of a graphical user interface, the focus frame system 102 generates a focus frame corresponding to the portion of the three-dimensional environment. For instance, the focus frame system 102 generates the focus frame by determining a boundary of the region indicated by the interface markers and then defining the focus frame according to the boundary. Thus, in one or more embodiments, a focus frame includes a specified region of a graphical user interface that the focus frame system 102 uses to determine a portion of a three-dimensional environment for applying a higher sampling rate to the determined portion than to other portions of the three-dimensional environment.

Additionally, in one or more embodiments, the focus frame system 102 attaches the focus frame to the 3D element displayed within the selected region of the graphical user interface. For example, the focus frame system 102 attaches the focus frame to the three-dimensional element by associating the focus frame with an element identifier of the three-dimensional element. To illustrate, the focus frame system 102 stores an identifier for the focus frame with the object identifier in a digital file associated with the three-dimensional environment. The focus frame system 102 can also store data defining the boundary of the focus frame with the object identifier.

FIG. 3A illustrates that the series of acts 300 also includes an act 310 of assigning a first sampling rate to the focus frame and an act 312 of assigning a second sampling rate outside the focus frame. In particular, as mentioned, the focus frame system 102 determines the first sampling rate for applying to a portion of the three-dimensional environment displayed within the focus frame. Additionally, the focus frame system 102 determines the second sampling rate for applying to one or more portions of the three-dimensional environment not displayed within the focus frame. More specifically, the focus frame system 102 determines the first sampling rate to be higher than the second sampling rate for sampling the portion of the three-dimensional environment displayed within the focus frame faster than the one or more portions of the three-dimensional environment not displayed within the focus frame.

In one or more embodiments, the focus frame system 102 determines the first sampling rate and the second sampling rate based on a sampling ratio. For instance, the focus frame system 102 determines a sampling ratio based on render settings or user preferences. In some embodiments, the sampling ratio indicates a ratio between a rate for sampling inside the focus frame and a rate for sampling outside the focus frame. Accordingly, in some embodiments, the focus frame system 102 determines the first sampling rate based on, or in conjunction with, the second sampling rate.

FIG. 3A illustrates that the series of acts 300 also includes an act 314 of rendering a three-dimensional environment based on the first sampling rate and the second sampling rate. Specifically, in one or more embodiments, after generating the focus frame and determining the sampling rates for the different portions of the three-dimensional environment, the focus frame system 102 generates a rendered image by rendering the three-dimensional environment according to the assigned sampling rates. For example, the focus frame system 102 renders the portion of the three-dimensional environment including the three-dimensional element (e.g., the portion displayed within the focus frame) utilizing the first sampling rate. Additionally, the focus frame system 102 renders the portion(s) of the three-dimensional environment outside of the focus frame utilizing the second sampling rate.

As mentioned, after generating a focus frame, in one or more embodiments, the focus frame system 102 also updates the focus frame in response to changes within a three-dimensional environment. FIG. 3B illustrates a series of acts 301 in which the focus frame system 102 updates a focus frame for rendering a three-dimensional environment based on changes to the three-dimensional environment. By updating the focus frame, the focus frame system 102 continues updating objects of interest when rendering the three-dimensional environment.

As shown in FIG. 3B, the series of acts 301 includes an act 316 of receiving a modification to a position of a three-dimensional element. In one or more embodiments, the focus frame system 102 determines that a three-dimensional element displayed within a focus frame changes position within a three-dimensional environment. For example, the focus frame system 102 determines that a three-dimensional element associated with the focus frame (e.g., an element to which the focus frame system 102 attached the focus frame) changes from one position to another position within the three-dimensional environment. In some embodiments, the focus frame system 102 determines that a group of three-dimensional elements (e.g., two or more elements) displayed within the focus frame changes position within the three-dimensional environment.

FIG. 3B also illustrates that the series of acts 301 includes an act 318 of receiving a modification to a view of a three-dimensional environment. To illustrate, the focus frame system 102 determines that a perspective view of the three-dimensional environment changes based on a change in position or direction of a camera element within the three-dimensional environment. In one or more embodiments, the view of the three-dimensional environment corresponds to a rendering view that the focus frame system 102 uses to generate a rendered image from the three-dimensional environment. Accordingly, the focus frame system 102 determines that a rendering view of the three-dimensional environment changes, which results in changing a rendered output without modifying a position of any elements originally displayed within the graphical user interface (including elements displayed within the focus frame).

In response to determining that a position of a three-dimensional element or a view of a three-dimensional environment changes, FIG. 3B illustrates that the series of acts 301 includes an act 320 of updating the position and size of a focus frame. For example, in response to detecting a change in position of a three-dimensional element to which the focus frame is attached, the focus frame system 102 updates a position of the focus frame based on the new position of the three-dimensional element. Additionally, in some embodiments, the focus frame system 102 updates a size of the focus frame based on a change in distance of the three-dimensional element relative to a view of the three-dimensional environment.

According to one or more embodiments, the focus frame system 102 also updates the position and size of the focus frame in response to detecting a change in the view (e.g., a view transformation) of the three-dimensional environment. For instance, in response to a change in position of a camera element within the three-dimensional environment, the focus frame system 102 updates a position of the focus frame to maintain a render priority focus on the attached three-dimensional element. In particular, the focus frame system 102 modifies a position and a size of the focus frame to maintain a consistent position of the three-dimensional element within the focus frame before and after a transformation of the view, as possible.

In one or more embodiments, the focus frame system 102 receives a modification to a position of a three-dimensional element, a modification to a view of a three-dimensional environment, or both. Accordingly, the focus frame system 102 detects any changes to the three-dimensional environment. More specifically, to update the position and size of the focus frame, in one or more embodiments, the focus frame system 102 detects a modification to only a position of a three-dimensional element. In alternative embodiments, the focus frame system 102 detects only a modification to a view of a three-dimensional environment. The focus frame system 102 thus updates the focus frame depending on the context of changes made within the three-dimensional environment.

FIG. 3B also illustrates that the series of acts 301 includes an act 322 of rendering the three-dimensional environment based on the updated focus frame. In one or more embodiments, after updating the position and/or size of the focus frame, the focus frame system 102 renders the three-dimensional environment utilizing the new position and/or size of the focus frame. For example, the focus frame system 102 renders the three-dimensional environment by rendering a portion of the three-dimensional environment displayed within the updated focus frame at a first sampling rate (e.g., as previously described in FIG. 3A). Additionally, the focus frame system 102 renders the three-dimensional environment by rendering one or more portions of the three-dimensional environment not displayed within the updated focus frame at a second sampling rate.

By updating a focus frame and utilizing the updated focus frame to render a three-dimensional environment utilizing different sampling rates, the focus frame system 102 provides live render previews of the three-dimensional environment. Specifically, the focus frame system 102 provides live updates in response to modifications to one or more three-dimensional elements and/or camera positions while also maintaining a sampling ratio for content displayed within the focus frame and content displayed outside the focus frame. Thus, the focus frame system 102 renders salient content in the three-dimensional environment more quickly than content of less importance, as determined by the focus frame.

Figure 4:
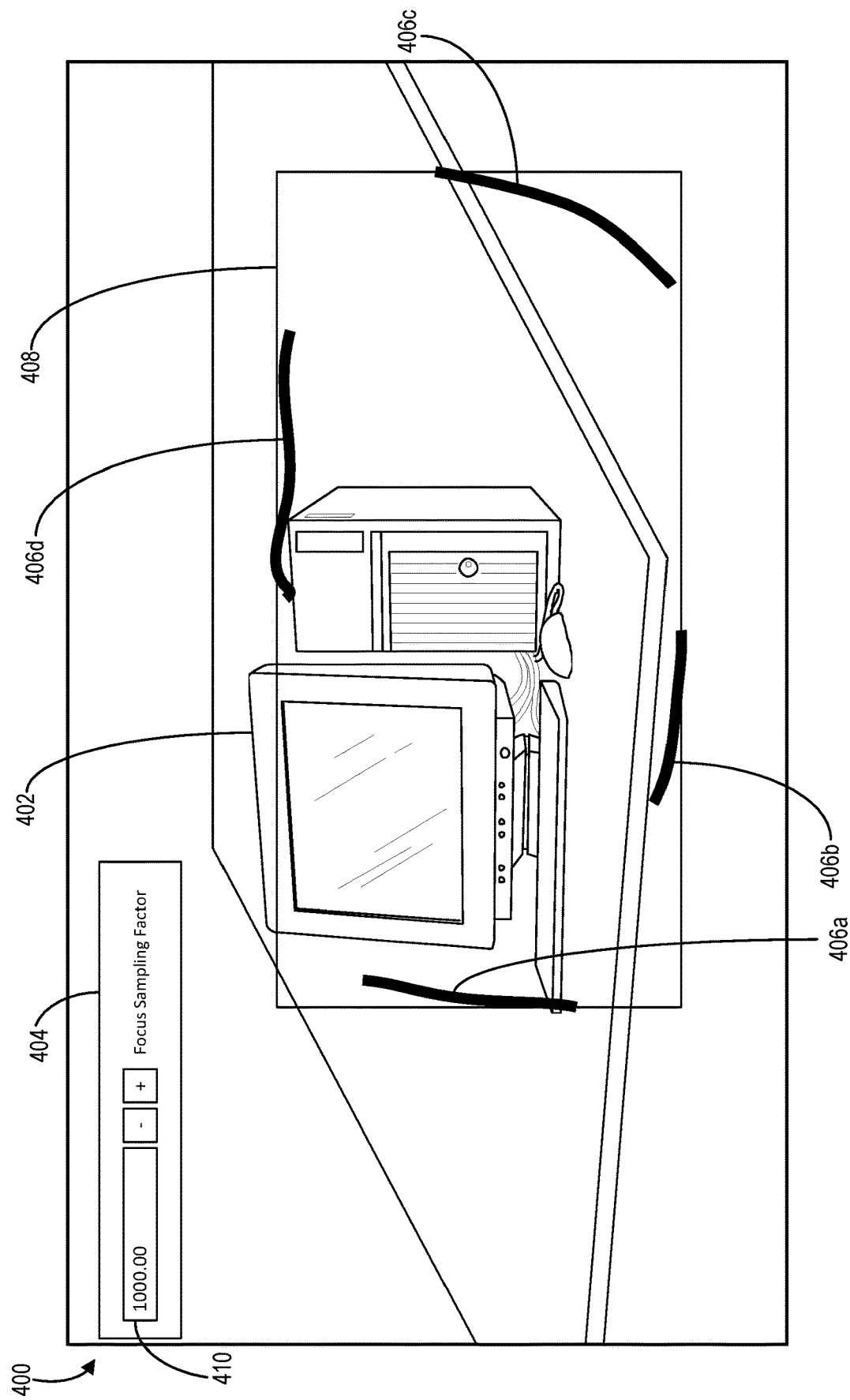
FIG. 4 illustrates a graphical user interface displaying a rendering preview of a three-dimensional environment with a focus frame in accordance with one or more implementations.

FIG. 4 illustrates a graphical user interface 400 including a three-dimensional environment. In one or more embodiments, the focus frame system 102 provides the graphical user interface 400 via a client application for display on a client device (e.g., client device 106 of FIG. 1). For example, the client device displays the three-dimensional environment within a three-dimensional editing application that provides tools for viewing, generating, and editing three-dimensional environments. As illustrated in FIG. 4, the client device displays the three-dimensional environment including a three-dimensional object 402. In some embodiments, the three-dimensional environment also includes a light source for providing illumination to a scene including the three-dimensional object 402.

In one or more embodiments, the focus frame system 102 provides a marker tool 404 for inserting a plurality of interface markers into the graphical user interface 400. For example, FIG. 4 illustrates the marker tool 404 includes a brushstroke tool that allows a user to insert brushstrokes into the graphical user interface 400. Furthermore, in some embodiments, the marker tool 404 provides an option to set a function of the marker tool 404 including, but not limited to, a focus function to generate a focus frame within the graphical user interface 40. Thus, in response to a user input to select a focus function for the marker tool 404, the focus frame system 102 utilizes interface markers inserted into the graphical user interface 400 to generate the focus frame.

FIG. 4 illustrates a plurality of brushstrokes inserted into the graphical user interface 400. Specifically, FIG. 4 illustrates a first brushstroke 406a, a second brushstroke 406b, a third brushstroke 406c, and a fourth brushstroke 406d (collectively "brushstrokes 406a-406d"). In one or more embodiments, the focus frame system 102 generates a focus frame 408 by determining a selected region of the graphical user interface 400 based on the positions of the brushstrokes 406a-406d. For instance, the focus frame system 102 estimates a boundary of the selected region by generating a boundary that includes all of the brushstrokes within the boundary. As illustrated in FIG. 4, the focus frame system 102 determines a boundary of the selected region including a left edge of the selected region based on the position of the first brushstroke 406a, a bottom edge of the selected region based on the position of the second brushstroke 406b, a right edge of the selected region based on the position of the third brushstroke 406c, and a top edge of the selected region based on the position of the fourth brushstroke 406d.

As further illustrated in FIG. 4, in one or more embodiments, the focus frame system 102 determines each edge based on a vector value corresponding to each of the brushstrokes 406a-406d. For instance, a brushstroke can include a vector value that defines a path of the brushstrokes. Accordingly, in one or more embodiments, the focus frame system 102 determines an edge corresponding to a brushstroke to include the path.

Although FIG. 4 illustrates four brushstrokes indicating the edges of the boundary, in one or more embodiments, the focus frame system 102 generates a focus frame based on less than four interface markers. For example, the focus frame system 102 determines that two or three interface markers provide a shape from which the focus frame system 102 estimates the boundary of a focus frame. To illustrate, the focus frame system 102 estimates more than one edge in response to an interface marker that indicates a corner position of a boundary. Accordingly, in some instances, the focus frame system 102 generates the focus frame based on two interface markers indicating opposite corners of the boundary. Additionally, the focus frame system 102 can generate focus frames of a variety of shapes (e.g., rectangular, circular, freeform).

In some embodiments, the focus frame system 102 determines a boundary that does not encompass an entire width of the stroke path. For example, FIG. 4 illustrates that each brushstroke includes a stroke width that defines a visible width of the path for the brushstroke, such that at least a portion of each brushstrokes is outside of the boundary of the focus frame 408. More specifically, FIG. 4 illustrates that a vector path for each brushstroke is at the center of each brushstroke (i.e. a center value along a length of each brushstroke), resulting in the boundary encompassing at least half of a width of each brushstroke at the farthest position of the brushstroke. Thus, the focus frame system 102 can generate focus frames based on consistent interface marker behavior regardless of stroke width.

In alternative embodiments, the focus frame system 102 generates focus frames to include each interface marker including (e.g., entirely encompassing) a stroke width of each interface marker such that the focus frame system 102 generates a focus frame around the brushstrokes. In one or more additional embodiments, the focus frame system 102 determines a focus frame based on a region (in screen space or environment space) of a predetermined size that encompasses the brushstrokes within the focus frame. In some embodiments, the focus frame system 102 also determines a nested focus frame (e.g., a focus frame within another focus frame) in response to receiving an additional set of brushstrokes within a first focus frame, thus providing a plurality of different sampling rates based on the boundaries of the first focus frame and the nested focus frame. In additional embodiments, the focus frame system 102 utilizes brushstrokes to define a larger/smaller focus frame (e.g., with a morphological erosion/dilation of a former convex hull of brushstroke points in a reference frame of the graphical user interface or in a reference frame of the three-dimensional environment).

In one or more additional embodiments, the focus frame system 102 utilizes other interface markers for determining a boundary of a focus frame. For instance, the focus frame system 102 provides a marker tool comprising a digital pencil tool or a digital pen tool. Alternatively, the focus frame system 102 provides a customizable marker tool that the focus frame system 102 changes from one type of interface marker input to another type of input in response to a selection by a user. In additional embodiments, the focus frame system 102 provides a selection tool for directly selecting the boundary (e.g., a rectangular selection tool, a circular selection tool, a freeform selection tool).

After generating the focus frame 408, the focus frame system 102 attaches the focus frame 408 to a portion of the three-dimensional environment. In one or more embodiments, the focus frame system 102 determines that the three-dimensional object 402 is displayed at least partially within the focus frame 408 in the graphical user interface 400. In response to determining that the three-dimensional object 402 is displayed within the focus frame 408, the focus frame system 102 attaches the focus frame 408 to the three-dimensional object 402. To illustrate, the focus frame system 102 associates an identifier of the focus frame 408 with an object identifier for the three-dimensional object 402. Additionally, in one or more embodiments, the focus frame system 102 stores information for the focus frame 408 with the three-dimensional object 402 such as the size and position (e.g., via one or more vertices defining the boundary).

While FIG. 4 illustrates that the three-dimensional environment includes a single object (i.e., three-dimensional object 402), a three-dimensional environment can include any number of three-dimensional elements. In one or more embodiments, in response to determining that a focus frame includes more than one element of a three-dimensional environment, the focus frame system 102 attaches the focus frame to a single element. For example, the focus frame system 102 attaches the focus frame to a three-dimensional element closest to a center of the focus frame or closest to a camera element within the three-dimensional environment. Alternatively, the focus frame system 102 attaches the focus frame to a three-dimensional element that takes up the most visible space within the focus frame. In additional embodiments, the focus frame system 102 attaches the focus frame to a plurality of elements, such as a group of similar elements.

As shown in FIG. 4, the focus frame system 102 also provides a sampling factor option 410 that allows a user to select a sampling ratio. In particular, the focus frame system 102 utilizes a value for the sampling factor option 410 to determine sampling rates for rendering the three-dimensional environment. For example, the focus frame system 102 utilizes the value of the sampling factor to determine a first sampling rate for sampling the portion of the three-dimensional environment displayed within the focus frame 408. Additionally, the focus frame system 102 utilizes the value of the sampling factor to determine a second sampling rate for sampling the portion(s) of the three-dimensional environment displayed outside the focus frame 408.

In the embodiment of FIG. 4, the focus frame system 102 renders part of the three-dimensional object 402 and areas of the three-dimensional environment near the three-dimensional object 402 inside the boundary of the focus frame 408 at the first sampling factor. Additionally, the focus frame system 102 renders the regions outside the focus frame 408 (including at least a portion of the three-dimensional object 402) at the second sampling factor. In one or more embodiments, the focus frame system 102 renders the three-dimensional environment to generate a live render preview so that a user can manipulate the three-dimensional environment via the client device while viewing the live render preview.

In one or more alternative embodiments, the focus frame system 102 utilizes a range of continuous sampling factors based on a focus frame. For instance, the focus frame system 102 determines a first sampling factor for rendering a portion of the three-dimensional environment within the focus frame 408. To render the portions of the three-dimensional environment outside the focus frame, the focus frame system 102 then decreases the sampling factor with distance from an edge of the focus frame 408 until meeting the second sampling factor at a point farthest from the focus frame 408 within a visible area of the three-dimensional environment. In additional embodiments, the focus frame system 102 renders a portion of the three-dimensional environment at a center of the focus frame 408 at the first sampling factor and then gradually decreases the sampling factor with distance away from the center within the focus frame 408. The focus frame system 102 may also continue decreasing the sampling factor outside the focus frame 408 with distance away from the focus frame 408 at the same or a greater rate of change than within the focus frame 408.

Figure 5A:
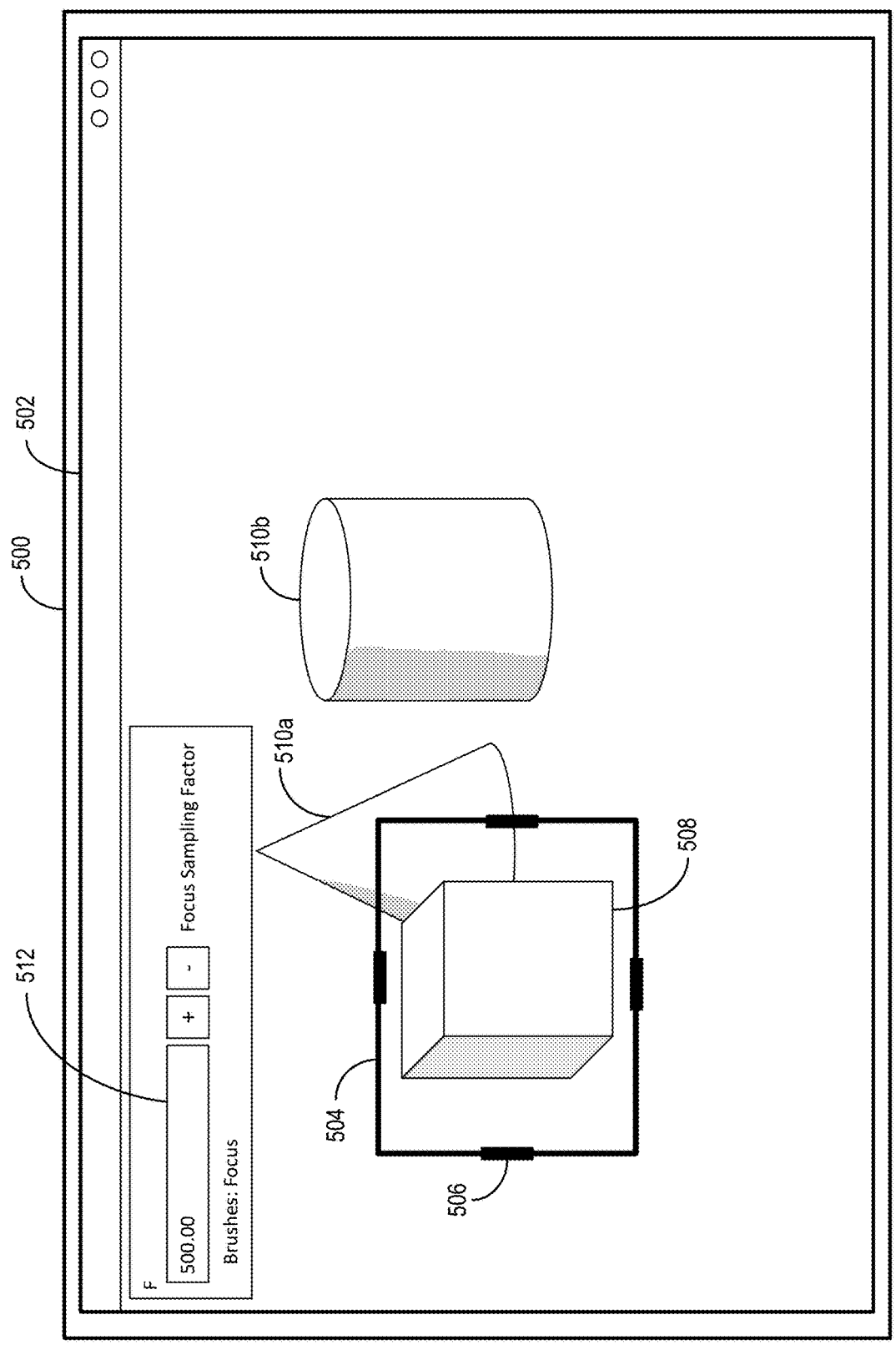
FIGS. 5A-5C illustrate graphical user interfaces displaying rendering previews of a three-dimensional environment with a focus frame as the objects or perspectives move in accordance with one or more implementations.
Figure 5B:
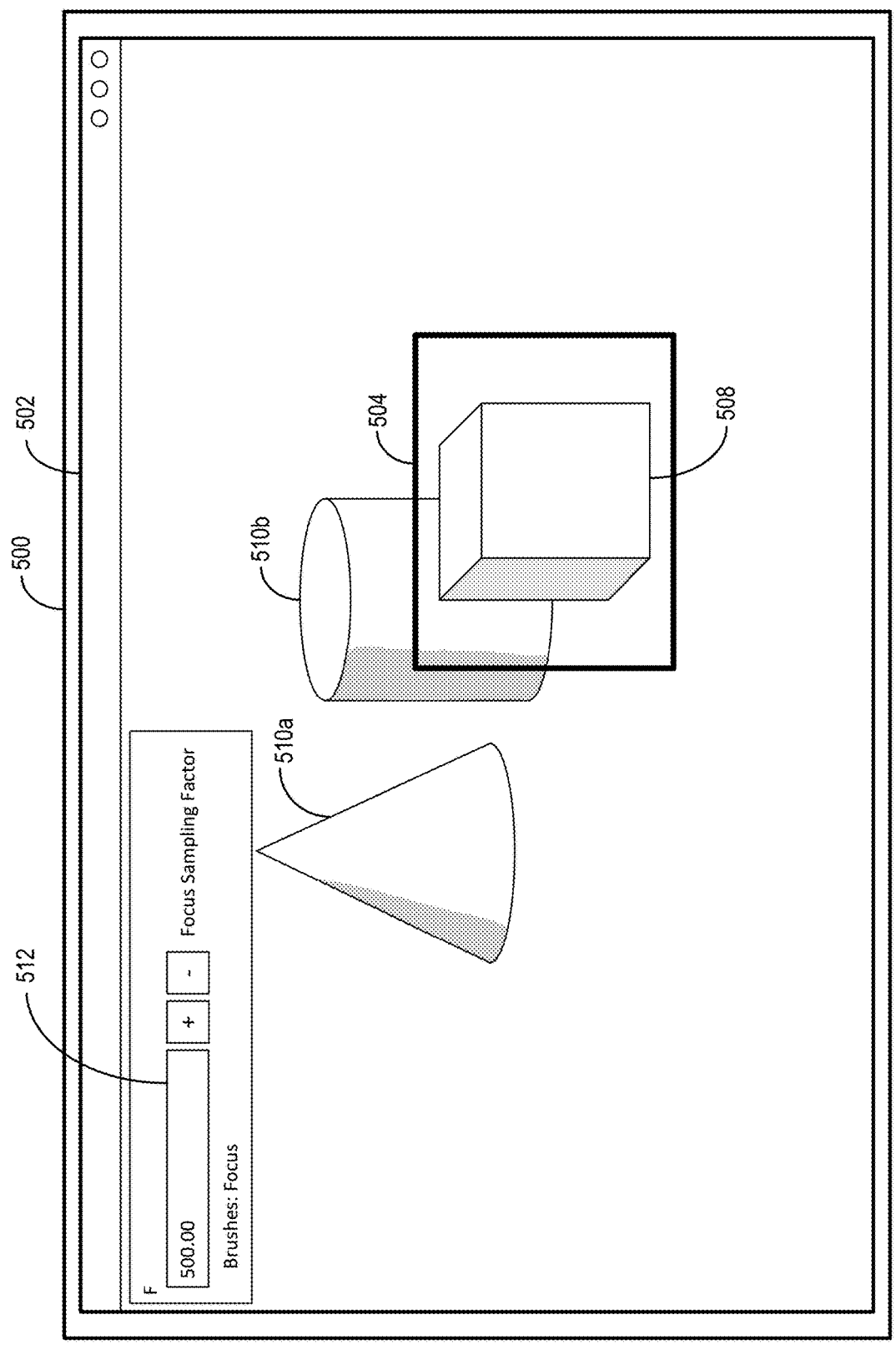
Figure 5C:
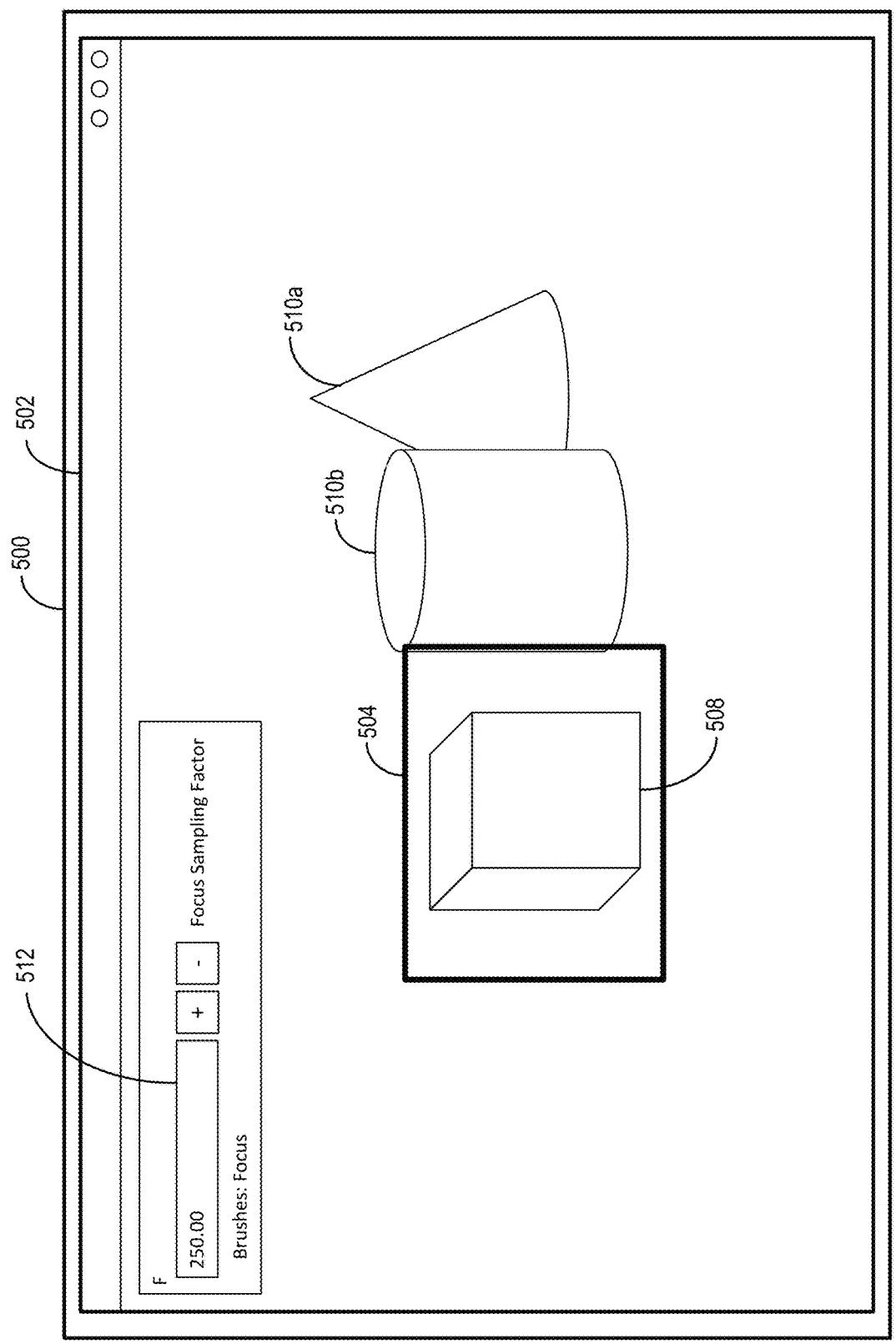

As previously described, the focus frame system 102 can automatically update a focus frame in response to modifications to a three-dimensional environment. In connection with automatically updating the focus frame, the focus frame system 102 can also automatically update a rendering of the three-dimensional environment according to a sampling ratio for the focus frame. FIGS. 5A-5C illustrate embodiments of a graphical user interface displaying a three-dimensional environment (e.g., via a client device 500 running a client application 502) in connection with automatically updating a rendering of the three-dimensional environment.

FIG. 5A illustrates the client device 500 including the client application 502 for generating, viewing, and/or otherwise interacting with a three-dimensional environment. Specifically, FIG. 5A illustrates that the focus frame system 102 determines a focus frame 504 based on a plurality of interface markers (e.g., interface marker 506) within the graphical user interface. Additionally, FIG. 5A illustrates that the focus frame system 102 attaches the focus frame 504 to a three-dimensional object 508 displayed within the focus frame 504. As also shown, the three-dimensional environment also includes additional three-dimensional elements (e.g., a first object 510a and a second object 510b). FIG. 5A illustrates that the first object 510a is partially displayed within the focus frame 504 and the second object 510b is not displayed within the focus frame 504.

In one or more embodiments, the focus frame system 102 receives an input to modify a position of the three-dimensional object 508 from a first position to a second position. Specifically, FIG. 5B illustrates that the three-dimensional object 508 moved from a first position (in FIG. 5A) to a second position (in FIG. 5B). Additionally, FIG. 5B illustrates that the positions of the first object 510a and the second object 510b did not change.

According to one or more embodiments, the focus frame system 102 determines that the position of the three-dimensional object 508 changed from the first position to the second position. In response to the change in position of the three-dimensional object 508, the focus frame system 102 updates the focus frame 504. Specifically, the focus frame system 102 modifies a position of the focus frame 504 to maintain the three-dimensional object 508 within the focus frame 504. In some embodiments, the focus frame system 102 moves the focus frame 504 to keep the three-dimensional object 508 in the same location (or approximately the same location) within the focus frame 504. For example, the focus frame system 102 determines a specific location of the three-dimensional object 508 (e.g., by a center point, a vertex, or a center of mass) to attach to a specific location of the focus frame 504 and then modifies the location of the focus frame 504 to keep the specific location at the attached location of the focus frame 504 (even if obscured by one or more other portions of the three-dimensional object 508 or another object).

In one or more embodiments, in addition to moving the focus frame 504 based on a changed position of the three-dimensional object 508, the focus frame system 102 also modifies a size of the focus frame 504. For instance, the focus frame system 102 determines that the three-dimensional object 508 changes position such that a two-dimensional representation of the three-dimensional object 508 within the graphical user interface changes size. To illustrate, the two-dimensional representation changes if the three-dimensional object 508 changes position to be closer to or farther away from a camera view within the three-dimensional environment. Accordingly, the focus frame system 102 changes the size of the focus frame 504 by increasing or decreasing the size to maintain a constant (or approximately constant) size ratio between the focus frame 504 and the three-dimensional object 508.

In additional embodiments, the focus frame system 102 also modifies the position and/or size of the focus frame 504 in response to a modification of a view within the graphical user interface. For example, FIG. 5C illustrates that a view of the three-dimensional environment as displayed within the graphical user interface changes. To illustrate, the view changes in response to a change in position or rotation of a camera element in the three-dimensional environment. Accordingly, as shown in FIG. 5C, the view changes based on a new position and rotation of the camera element to obtain a different perspective view of the three-dimensional object 508, the first object 510a, and the second object 510b without changing positions of any of the objects.

In response to determining that the view changes, FIG. 5C illustrates that the focus frame system 102 updates the focus frame 504. Specifically, because the focus frame system 102 attached the focus frame 504 to the three-dimensional object 508, the focus frame system 102 automatically updates the position of the focus frame 504 to maintain the position of the three-dimensional object 508 within the focus frame 504. Additionally, as mentioned, the focus frame system 102 also updates a size of the focus frame 504 if the displayed size (e.g., the size of the two-dimensional representation) of the three-dimensional object 508 changes. For instance, if the camera element is farther away from three-dimensional object with the same camera view parameters, the focus frame system 102 reduces the size of the focus frame 504. Alternatively, if the camera element is closer to the three-dimensional object with the same camera view parameters, the focus frame system 102 increases the size of the focus frame.

Additionally, as illustrated in FIGS. 5A-5C, by changing the position and/or size of the focus frame 504 based on changes to the three-dimensional object 508 and/or the camera element, the focus frame system 102 also changes other information displayed within the focus frame 504. For example, FIG. 5A illustrates that the focus frame 504 includes a portion of the first object 510a. In contrast, FIG. 5B shows that the focus frame 504 includes a portion of the second object 510b. Furthermore, FIG. 5C shows that the focus frame 504 includes a different perspective of a small part of the second object 510b. Accordingly, the focus frame system 102 renders different portions of the three-dimensional object within the focus frame based on changes to the three-dimensional object 508 and/or the camera view.

FIGS. 5A-5C also illustrate that the focus frame system 102 provides an option 512 for a user to modify a sampling factor associated with the focus frame 504, which can indicate a ratio between a sampling rate in the focus frame 504 and a sampling rate outside the focus frame. In particular, FIGS. 5A-5B illustrate the same value for the sampling factor ("500.00"), and FIG. 5C illustrates a different value for the sampling factor ("250.00"). Changing the sampling factor causes the focus frame system 102 to modify the sampling rate for rendering the portion of the three-dimensional environment within the focus frame 504 and/or the sampling rate for other portions of the three-dimensional environment. To illustrate, in response to determining that the sampling factor changes from a value of 500 to a value of 250, the focus frame system 102 re-calculates the sampling rates based on a total sampling budget. Similarly, the focus frame system 102 determines new sampling rates in response to a change in the total sampling budget, even if the value for the sampling factor does not change.

Additionally, in one or more embodiments, the focus frame system 102 re-calculates a focus frame in response to a user input to insert a new focus frame or to manually modify a shape or size of the focus frame. For example, the focus frame system 102 generates a new focus frame in response to detecting new interface markers within a graphical user interface. The focus frame system 102 also attaches the focus frame to a new three-dimensional element (or re-attaches the new focus frame to the same three-dimensional element) in response to generating the new focus frame.

Figure 6:
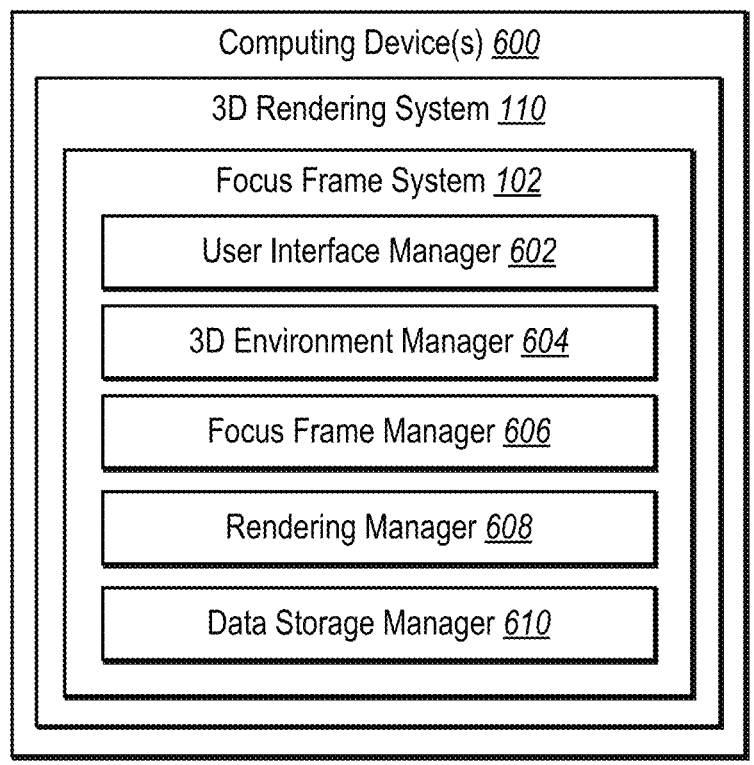
FIG. 6 illustrates an example architecture of the focus frame system of FIG. 1 in accordance with one or more implementations.

FIG. 6 illustrates a detailed schematic diagram of an embodiment of the focus frame system 102 described above. As shown, the focus frame system 102 is implemented in the 3D rendering system 60 on computing device(s) 600 (e.g., a client device and/or server device as described in FIG. 1, and as further described below in relation to FIG. 8). Additionally, in one or more embodiments, the focus frame system 102 includes, but is not limited to, a user interface manager 602, a 3D environment manager 604, a focus frame manager 606, a rendering manager 608, and a data storage manager 610. The focus frame system 102 can be implemented on any number of computing devices. For example, in some embodiments, the focus frame system 102 is implemented in a distributed system of server devices for managing three-dimensional environments. In additional embodiments, the focus frame system 102 is implemented within one or more additional systems. In alternative embodiments, the focus frame system 102 is implemented on a single computing device such as a single client device.

In one or more embodiments, each of the components of the focus frame system 102 is in communication with other components using any suitable communication technologies. Additionally, in some embodiments, the components of the focus frame system 102 are in communication with one or other devices including other computing devices of a user, server devices (e.g., cloud storage devices), licensing servers, or other devices/systems. It will be recognized that although the components of the focus frame system 102 are shown to be separate in FIG. 6, in one or more embodiments, one or more of the subcomponents are combined into fewer components, such as into a single component, or divided into more components as may serve a particular implementation. Furthermore, although the components of FIG. 6 are described in connection with the focus frame system 102, in alternative embodiments, at least some of the components for performing operations in conjunction with the focus frame system 102 described herein are implemented on other devices within the environment.

The components of the focus frame system 102 can include software, hardware, or both. For example, in one or more embodiments, the components of the focus frame system 102 include one or more instructions stored on a computer-readable storage medium and executable by processors of one or more computing devices (e.g., the computing device(s) 600). When executed by the one or more processors, the computer-executable instructions of the focus frame system 102 cause the computing device(s) 600 to perform the operations described herein. Alternatively, the components of the focus frame system 102 include hardware, such as a special purpose processing device to perform a certain function or group of functions. Additionally, or alternatively, the components of the focus frame system 102 include a combination of computer-executable instructions and hardware.

Furthermore, the components of the focus frame system 102 performing the functions described herein with respect to the focus frame system 102 may, for example, be implemented as part of a stand-alone application, as a module of an application, as a plug-in for applications, as a library function or functions that may be called by other applications, and/or as a cloud-computing model. Thus, the components of the focus frame system 102 may be implemented as part of a stand-alone application on a personal computing device or a mobile device. In some embodiments, the components of the focus frame system 102 are implemented in an application that provides three-dimensional image editing, including, but not limited to ADOBE DIMENSION, SUBSTANCE PAINTER, SUBSTANCE DESIGNER, SUBSTANCE ALCHEMIST, MEDIUM, "ADOBE," "ADOBE DIMENSION," are either registered trademarks or trademarks of Adobe Inc. in the United States and/or other countries.

FIG. 6 illustrates that the focus frame system 102 includes a user interface manager 602 to manage a graphical user interface in a three-dimensional image editing application. For example, the user interface manager 602 displays a three-dimensional environment including one or more three-dimensional elements. Additionally, the user interface manager 602 provides tools for interacting with the three-dimensional environment and/or the graphical user interface. To illustrate, the user interface manager 602 provides a tool to mark the graphical user interface to generate a focus frame. The user interface manager 602 also receives user inputs interacting with the three-dimensional environment and/or the graphical user interface based on the provided tools, such as receiving indications of markers designating a boundary of a focus frame.

Additionally, FIG. 6 illustrates that the focus frame system 102 includes a 3D environment manager 604. For example, the 3D environment manager 604 manages objects within a three-dimensional environment. To illustrate, the 3D environment manager 604 manages object information of a three-dimensional object including vertex information and material properties. The 3D environment manager 604 also manages information for light sources within a three-dimensional environment. For instance, the 3D environment manager 604 manages lighting parameters, size/shape information, and position information of one or more light sources that provide illumination within a scene of the three-dimensional environment.

FIG. 6 further illustrates that the focus frame system 102 includes a focus frame manager 606. Specifically, the focus frame manager 606 utilizes information associated with interface markers that mark a graphical user interface (e.g., by receiving indications of the interface markers from the user interface manager 602) to generate a focus frame in connection with a three-dimensional environment. In one or more embodiments, the focus frame manager 606 also determines a portion of the three-dimensional environment (e.g., one or more three-dimensional elements) corresponding to the focus frame. The focus frame manager 606 also updates the focus frame in response to modifications to the three-dimensional environment or to a view of the three-dimensional environment.

FIG. 6 illustrates that the focus frame system 102 includes a rendering manager 608. For example, the rendering manager 608 renders a three-dimensional environment by sampling the three-dimensional environment based on lighting within the three-dimensional environment. In one or more embodiments, the rendering manager 608 utilizes different sampling rates for different portions of the three-dimensional environment according to a focus frame. Specifically, the rendering manager 608 samples a portion of the three-dimensional environment displayed within a focus frame on a graphical user interface at a first sampling rate and at least one other portion of the three-dimensional environment outside the focus frame at a second sampling rate.

The focus frame system 102 also includes a data storage manager 610 (that comprises a non-transitory computer memory/one or more memory devices) that stores and maintains data associated with three-dimensional environments. For example, the data storage manager 610 stores three-dimensional element data. Additionally, the data storage manager 610 can store information related to focus frames in a graphical user interface displaying three-dimensional environments. To illustrate, the data storage manager 610 stores data indicating an association between a focus frame and one or more three-dimensional elements.

Figure 7:
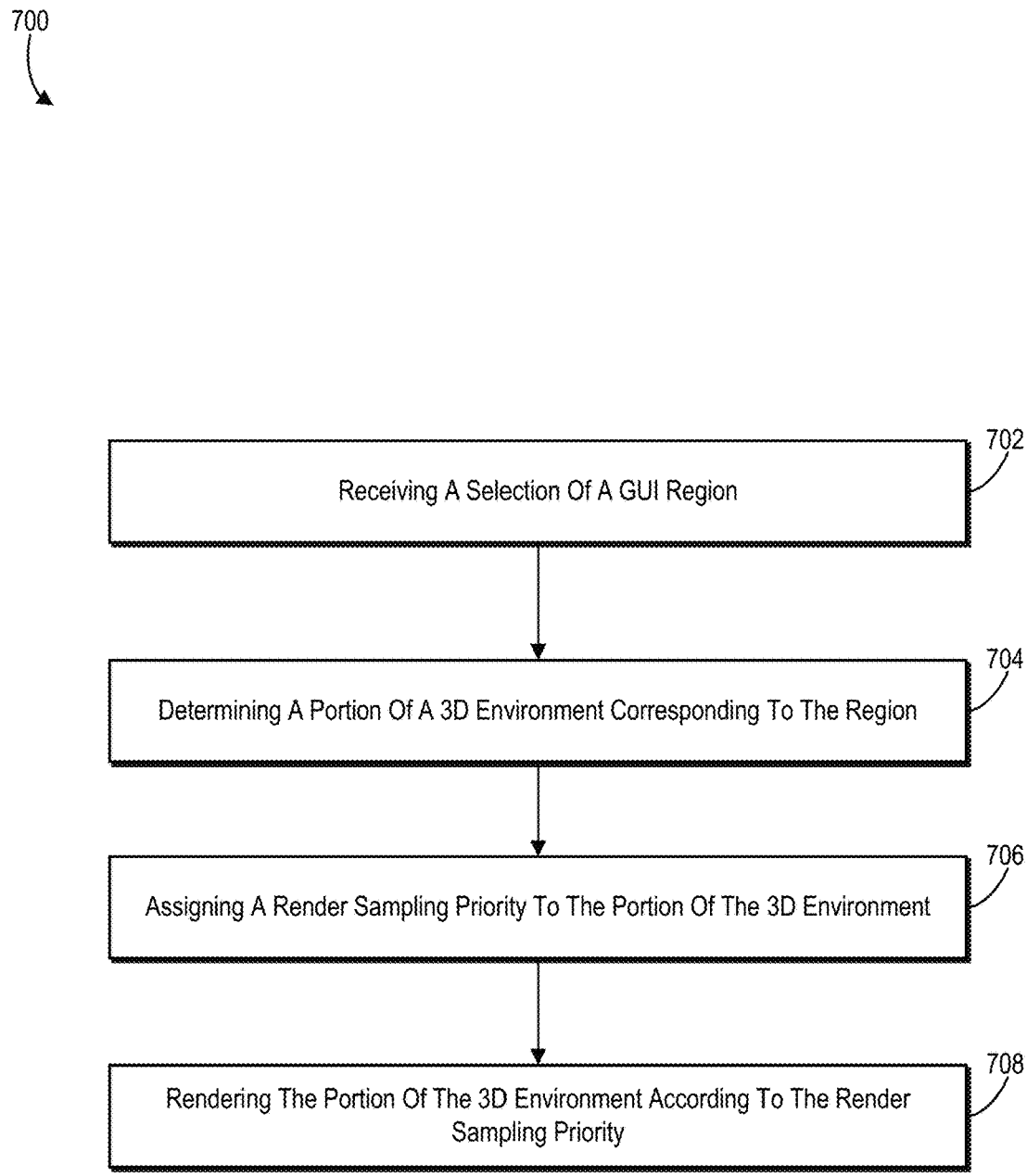
FIG. 7 illustrates a flowchart of a series of acts for rendering a three-dimensional environment including a focus frame in accordance with one or more implementations.

Turning now to FIG. 7, this figure shows a flowchart of a series of acts 700 of rendering portions of a three-dimensional environment using more than one sampling rate based on a focus frame. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

As shown, the series of acts 700 includes an act 702 of receiving a selection of a graphical user interface ("GUI") region. For example, act 702 involves receiving a selection of a region of a graphical user interface displaying a three-dimensional environment. Act 702 can involve receiving a plurality of interface markers within the graphical user interface. Act 702 can then involve determining the region of the graphical user interface by estimating a boundary formed by the plurality of interface markers.

In one or more embodiments, act 702 involves providing, for display within the graphical user interface, a brushstroke tool comprising an option to mark a render priority region. Additionally, act 702 can involve receiving a plurality of positions of a plurality of brushstrokes associated with the brushstroke tool within the graphical user interface. Act 702 can then involve determining the region of the graphical user interface based on the render priority region.

The series of acts 700 also includes an act 704 of determining a portion of a three-dimensional ("3D") environment corresponding to the region. For example, act 704 involves determining a portion of a three-dimensional environment corresponding to the region of the graphical user interface. In one or more embodiments, act 704 involves determining a portion of the three-dimensional environment comprising a three-dimensional element displayed within the boundary of the region of the graphical user interface.

Additionally, the series of acts 700 includes an act 706 of assigning a render sampling priority to the portion of the 3D environment. For example, act 706 involves assigning, in response to receiving the selection of the region of the graphical user interface, a render sampling priority to the portion of the three-dimensional environment. In one or more embodiments, act 706 involves assigning the render sampling priority to the portion of the three-dimensional environment by determining a sampling ratio comprising a first sampling rate for the portion of the three-dimensional environment and a second sampling rate for the portions of the three-dimensional environment outside the region of the graphical user interface, wherein the first sampling rate is higher than the second sampling rate.

Act 706 can involve assigning a higher sampling rate to the portion of the three-dimensional environment than a sampling rate for an additional portion of the three-dimensional environment corresponding to an additional region of the graphical user interface outside the region of the graphical user interface. Act 706 can involve receiving an indication of a sampling budget for rendering the portion of the three-dimensional environment. Act 706 can then involve determining, based on the indication of the sampling budget, the higher sampling rate to include a number of samples for sampling pixels associated with the portion of the three-dimensional environment. For example, act 706 can involve determining, based on a sampling ratio corresponding to the render sampling priority and a sampling budget, a first number of samples per pixel for the portion of the three-dimensional environment. Act 706 can also involve determining, based on the sampling ratio, a second number of samples per pixel for the portions of the three-dimensional environment outside the region of the graphical user interface.

Furthermore, the series of acts 700 includes an act 708 of rendering the portion of the 3D environment according to the render sampling priority. For example, act 708 involves rendering, for display within the graphical user interface, the portion of the three-dimensional environment according to the render sampling priority. Act 708 can involve rendering the portion of the three-dimensional environment at the higher sampling rate and the additional portion at a lower sampling rate. Accordingly, act 708 can involve rendering, for display within the graphical user interface, the three-dimensional environment by sampling the portion of the three-dimensional environment comprising the three-dimensional element at the higher sampling rate and the portions of the three-dimensional environment outside the region of the graphical user interface at a lower sampling rate. For instance, act 708 can involve rendering the three-dimensional environment according to the first number of samples per pixel for the portion of the three-dimensional environment and the second number of samples per pixel for the portions of the three-dimensional environment outside the region of the graphical user interface.

In one or more embodiments, act 708 involves rendering the portion of the three-dimensional environment in real-time as a view of the graphical user interface corresponding to the portion of the three-dimensional environment or a three-dimensional element within the portion of the three-dimensional environment changes. For example, act 708 can involve continuously sampling the portion of the three-dimensional environment comprising the three-dimensional element at the higher sampling rate as a view of the three-dimensional environment within the graphical user interface changes.

In one or more embodiments, the series of acts 700 includes determining that a view of the graphical user interface changes from a first view to a second view. For example, the series of acts 700 can include determining that a camera position within the three-dimensional environment changes from a first position to a second position. Additionally, the series of acts 700 can include updating a display of the portion of the three-dimensional environment for the second view. For instance, the series of acts 700 can include updating, in response to the camera position changing from the first position to the second position, a two-dimensional view of the three-dimensional environment. The series of acts 700 can then include rendering, according to the updated display within the graphical user interface, the portion of the three-dimensional environment according to the render sampling priority. To illustrate, the series of acts 700 can include rendering, for display within the graphical user interface, the portion of the three-dimensional environment at the higher sampling rate according to the updated two-dimensional view of the three-dimensional environment.

In additional embodiments, the series of acts 700 includes determining that a position of a three-dimensional element in the three-dimensional environment changes from a first position to a second position within the three-dimensional environment. For example, the series of acts 700 can include determining that a position of the three-dimensional element changes from the portion of the three-dimensional environment to a new portion of the three-dimensional environment. The series of acts 700 can include assigning the render sampling priority to a new portion of the three-dimensional environment corresponding to the second position of the three-dimensional element. The series of acts 700 can then include rendering, for display within the graphical user interface, the new portion of the three-dimensional environment according to the render sampling priority.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
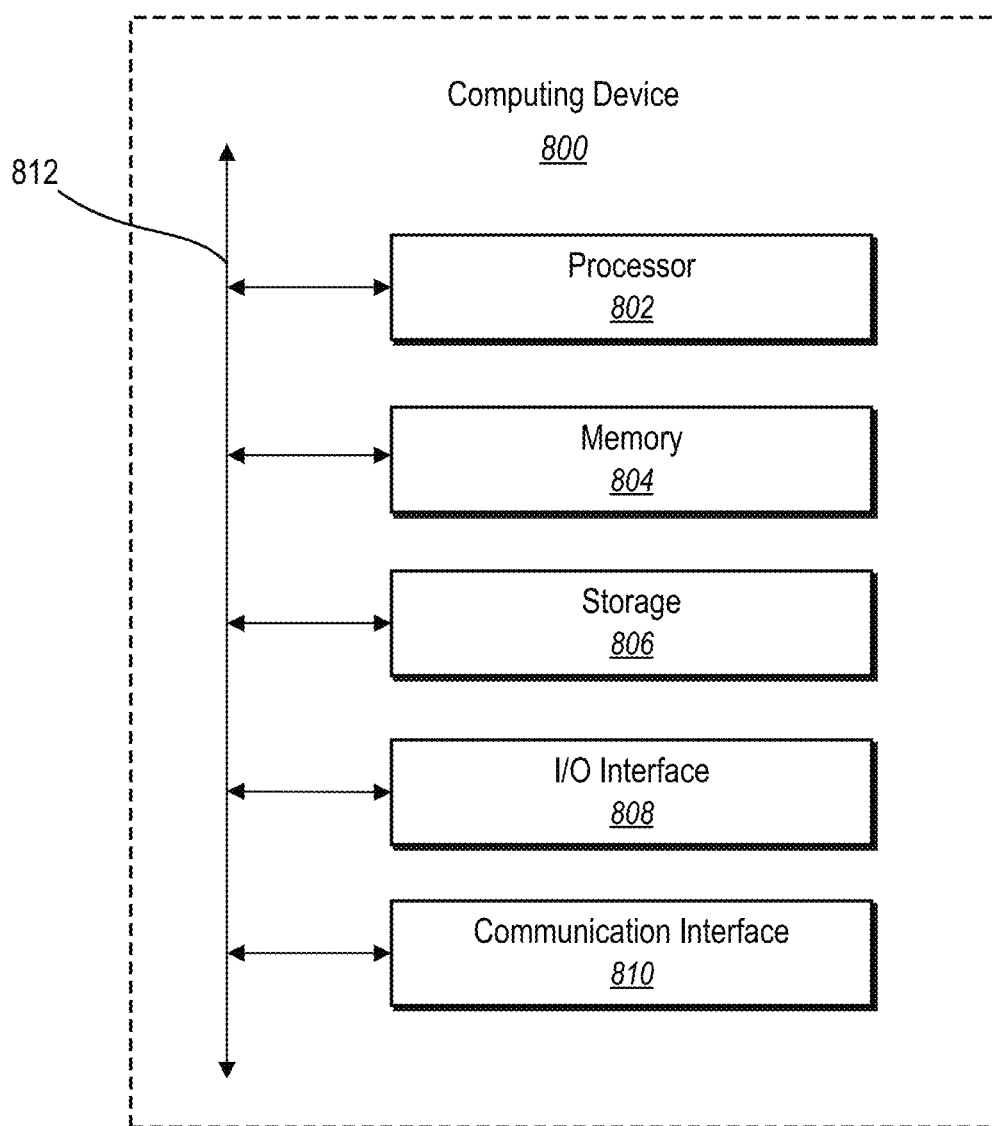
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the system(s) of FIG. 1. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example, and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   receive a plurality of individual brushstrokes that mark a boundary of a region of a graphical user interface displaying a three-dimensional environment;
   determine a portion of a three-dimensional environment comprising a three-dimensional element corresponding to the region of the graphical user interface;
   attach, in response to receiving the plurality of individual brushstrokes that mark the boundary of the region, a focus frame to the three-dimensional element in the region of the graphical user interface, wherein attaching the focus frame to the three-dimensional element modifies a position or a size of the focus frame in response to a modification to the three-dimensional element relative to the three-dimensional environment or a view within the graphical user interface;
   assign, in response to the focus frame being attached to the three-dimensional element, a render sampling priority to the portion of the three-dimensional environment; and
   render, for display within the graphical user interface, the portion of the three-dimensional environment comprising the three-dimensional element according to the render sampling priority.

2. The non-transitory computer readable storage medium as recited in claim 1, further comprising instructions that, when executed by the at least one processor, cause the computing device to:
   determine that a view of the graphical user interface changes from a first view to a second view;
   update a display of the portion of the three-dimensional environment for the second view based on a position of the three-dimensional element within the second view; and
   render, according to the updated display within the graphical user interface, the portion of the three-dimensional environment comprising the three-dimensional element according to the render sampling priority.

3. The non-transitory computer readable storage medium as recited in claim 1, further comprising instructions that, when executed by the at least one processor, cause the computing device to:
   determine that a position of the three-dimensional element in the portion of the three-dimensional environment changes from a first position to a second position within the three-dimensional environment;
   assign, based on the focus frame being attached to the three-dimensional element, the render sampling priority to a new portion of the three-dimensional environment corresponding to the second position of the three-dimensional element; and
   render, for display within the graphical user interface, the new portion of the three-dimensional environment comprising the three-dimensional element according to the render sampling priority.

4. The non-transitory computer readable storage medium as recited in claim 1, further comprising instructions that, when executed by the at least one processor, cause the computing device to assign the render sampling priority to the portion of the three-dimensional environment by assigning a higher sampling rate to the portion of the three-dimensional environment than a sampling rate for an additional portion of the three-dimensional environment corresponding to an additional region of the graphical user interface outside the region of the graphical user interface.

5. The non-transitory computer readable storage medium as recited in claim 4, further comprising instructions that, when executed by the at least one processor, cause the computing device to render the portion of the three-dimensional environment at the higher sampling rate and the additional portion at a lower sampling rate.

6. The non-transitory computer readable storage medium as recited in claim 4, further comprising instructions that, when executed by the at least one processor, cause the computing device to assign the higher sampling rate to the portion of the three-dimensional environment by:
   receiving an indication of a sampling budget for rendering the portion of the three-dimensional environment; and
   determining, based on the indication of the sampling budget, the higher sampling rate to include a number of samples for sampling pixels associated with the portion of the three-dimensional environment.

7. The non-transitory computer readable storage medium as recited in claim 1, further comprising instructions that, when executed by the at least one processor, cause the computing device to receive the plurality of individual brushstrokes by:
providing, for display within the graphical user interface, a brushstroke tool comprising an option to mark a render priority region;
receiving a plurality of positions of the plurality of individual brushstrokes within the graphical user interface via the brushstroke tool; and
determining the region of the graphical user interface by estimating the boundary of the region formed by the plurality of positions of the plurality of individual brushstrokes.

8. The non-transitory computer readable storage medium as recited in claim 7, further comprising instructions that, when executed by the at least one processor, cause the computing device to receive the plurality of individual brushstrokes by:
determining, for a brushstroke of the plurality of individual brushstrokes, a vector value defining a path of the brushstroke; and
determining an edge of the region corresponding to the brushstroke to include at least a portion of the path of the brushstroke.

9. The non-transitory computer readable storage medium as recited in claim 1, further comprising instructions that, when executed by the at least one processor, cause the computing device to render the portion of the three-dimensional environment by rendering the portion of the three-dimensional environment in real-time as a view of the graphical user interface corresponding to the portion of the three-dimensional environment or a three-dimensional element within the portion of the three-dimensional environment changes.

10. A system comprising:
at least one computer memory device; and
one or more servers configured to cause the system to:
receive a plurality of individual brushstrokes that mark a boundary of a region of a graphical user interface displaying a three-dimensional environment;
determine, based on the plurality of individual brushstrokes, a portion of the three-dimensional environment comprising a three-dimensional element displayed within the boundary of the region of the graphical user interface;
assign, in response to receiving the plurality of individual brushstrokes that mark the boundary of the region of the graphical user interface, a render sampling priority to the portion of the three-dimensional environment comprising the three-dimensional element to utilize a higher sampling rate for the three-dimensional element than for portions of the three-dimensional environment outside the region of the graphical user interface; and
rendering, for display within the graphical user interface, the three-dimensional environment by sampling the portion of the three-dimensional environment comprising the three-dimensional element at the higher sampling rate and the portions of the three-dimensional environment outside the region of the graphical user interface at a lower sampling rate.

11. The system as recited in claim 10, wherein the one or more servers are further configured to cause the system to:
attach a focus frame to the three-dimensional element, wherein attaching the focus frame to the three-dimensional element modifies a position or a size of the focus frame in response to a modification to the three-dimensional element relative to the three-dimensional environment;
determine that a position of the three-dimensional element changes from the portion of the three-dimensional environment to a new portion of the three-dimensional environment; and
render the three-dimensional environment by sampling the new portion of the three-dimensional environment at the higher sampling rate.

12. The system as recited in claim 10, wherein the one or more servers are further configured to cause the system to:
attach a focus frame to the three-dimensional element, wherein attaching the focus frame to the three-dimensional element modifies a position or a size of the focus frame in response to a modification to a view within the graphical user interface;
determine that a camera position within the three-dimensional environment changes from a first position to a second position;
update, in response to the camera position changing from the first position to the second position, a two-dimensional view of the three-dimensional environment; and
render, for display within the graphical user interface, the portion of the three-dimensional environment at the higher sampling rate according to the updated two-dimensional view of the three-dimensional environment.

13. The system as recited in claim 10, wherein the one or more servers are further configured to cause the system to assign the render sampling priority to the portion of the three-dimensional environment by:
presenting, within a graphical user interface, a sampling factor option for setting a sampling ratio for rendering the three-dimensional environment; and
determining, in response to an interaction with the sampling factor option within the graphical user interface, the sampling ratio comprising a first sampling rate for the portion of the three-dimensional environment and a second sampling rate for the portions of the three-dimensional environment outside the region of the graphical user interface, wherein the first sampling rate is higher than the second sampling rate.

14. The system as recited in claim 10, wherein the one or more servers are further configured to cause the system to render the three-dimensional environment by:
determining, based on a sampling ratio corresponding to the render sampling priority and a sampling budget, a first number of samples per pixel for the portion of the three-dimensional environment;
determining, based on the sampling ratio, a second number of samples per pixel for the portions of the three-dimensional environment outside the region of the graphical user interface; and
rendering the three-dimensional environment according to the first number of samples per pixel for the portion of the three-dimensional environment and the second number of samples per pixel for the portions of the three-dimensional environment outside the region of the graphical user interface.

15. The system as recited in claim 10, wherein the one or more servers are further configured to cause the system to receive the plurality of individual brushstrokes by:

providing, for display within the graphical user interface, a brushstroke tool comprising an option to mark a render priority region with the plurality of individual brushstrokes indicating two or more edges of the render priority region;

receiving positions of the plurality of individual brushstrokes associated with the brushstroke tool marking the two or more edges of the render priority region; and determining the region of the graphical user interface based on the render priority region.

16. The system as recited in claim 10, wherein the one or more servers are further configured to render the three-dimensional environment by continuously sampling the portion of the three-dimensional environment comprising the three-dimensional element at the higher sampling rate as a view of the three-dimensional environment within the graphical user interface changes.

17. A computer-implemented method comprising:

receiving, by at least one processor, a plurality of individual brushstrokes that mark a boundary of a region of a graphical user interface displaying a three-dimensional environment;

determining, by the at least one processor, a first portion of the three-dimensional environment comprising a three-dimensional element corresponding to the region of the graphical user interface and a second portion of the three-dimensional environment corresponding to an area outside the region of the graphical user interface;

attaching, in response to receiving the plurality of individual brushstrokes that mark the boundary of the region, a focus frame to the three-dimensional element in the region of the graphical user interface, wherein attaching the focus frame to the three-dimensional element modifies a position or a size of the focus frame in response to a modification to the three-dimensional element relative to the three-dimensional environment or a view within the graphical user interface;

assigning, by the at least one processor in response to the focus frame being attached to the three-dimensional element, a first sampling rate to the first portion of the three-dimensional environment within the focus frame and a second sampling rate to the second portion of the three-dimensional environment; and rendering, by the at least one processor, the first portion of the three-dimensional environment comprising the three-dimensional element based on the first sampling rate and the second portion of the three-dimensional environment based on the second sampling rate.

18. The computer-implemented method as recited in claim 17, further comprising:

receiving an updated position of the three-dimensional element within the three-dimensional environment;

assigning, based on the focus frame being attached to the three-dimensional element, the first sampling rate to a new portion of the three-dimensional environment comprising the updated position of the three-dimensional element; and rendering the new portion of the three-dimensional environment comprising the three-dimensional element based on the first sampling rate.

19. The computer-implemented method as recited in claim 17, wherein receiving the plurality of individual brushstrokes comprises:

receiving a plurality of positions of the plurality of individual brushstrokes marking two or more edges of the boundary within the graphical user interface; and determining the region of the graphical user interface based on the two or more edges of the boundary marked by the plurality of individual brushstrokes.

20. The computer-implemented method as recited in claim 17, further comprising:

receiving an indication of a sampling budget for rendering the three-dimensional environment; and determining the first sampling rate and the second sampling rate based on the sampling budget.

* * * * *